(12) United States Patent
Matsuyama et al.

(10) Patent No.: US 9,672,605 B2
(45) Date of Patent: Jun. 6, 2017

(54) IMAGE PROCESSING DEVICE AND IMAGE PROCESSING METHOD

(71) Applicant: PANASONIC INTELLECTUAL PROPERTY MANAGEMENT CO., LTD., Osaka (JP)

(72) Inventors: Yoshiyuki Matsuyama, Fukuoka (JP); Kenji Tabei, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 175 days.

(21) Appl. No.: 14/423,818

(22) PCT Filed: Sep. 26, 2013

(86) PCT No.: PCT/JP2013/005723
§ 371 (c)(1),
(2) Date: Feb. 25, 2015

(87) PCT Pub. No.: WO2014/050117
PCT Pub. Date: Apr. 3, 2014

(65) Prior Publication Data
US 2015/0221073 A1    Aug. 6, 2015

(30) Foreign Application Priority Data

Sep. 27, 2012 (JP) ................... 2012-213909
Oct. 31, 2012 (JP) ................... 2012-239849

(51) Int. Cl.
*G06K 9/00* (2006.01)
*G06T 5/50* (2006.01)
(Continued)

(52) U.S. Cl.
CPC ........... *G06T 5/50* (2013.01); *G06T 5/002* (2013.01); *G06T 5/20* (2013.01); *H04N 9/646* (2013.01);
(Continued)

(58) Field of Classification Search
None
See application file for complete search history.

(56) References Cited

U.S. PATENT DOCUMENTS

| 5,384,865 A | 1/1995 | Loveridge |
| 6,088,468 A | 7/2000 | Ito et al. |

(Continued)

FOREIGN PATENT DOCUMENTS

| JP | 9-73541 | 3/1997 |
| JP | 2000-115763 | 4/2000 |

(Continued)

OTHER PUBLICATIONS

Miyake et al., "Snowfall Noice Elimination Using a Time Median Filter", The Journal of the Institute of Image Electronics Engineers of Japan, vol. 30, No. 3, 2001, pp. 251-259.

(Continued)

*Primary Examiner* — Weiwen Yang
(74) *Attorney, Agent, or Firm* — Greenblum & Bernstein, P.L.C.

(57) ABSTRACT

To increase the processing speed when median processing in the time direction is performed on color images, pixel values of each channel (R, G and B values) are extracted from multiple temporally consecutive frame images; subsequently, identifiers (index numbers) corresponding to frame images from which the pixel values are extracted are assigned to the pixel values; subsequently, a sorting process is performed on a set of pixel values of one channel (G values) to obtain an identifier assigned to a median value (Continued)

thereof; subsequently, a pixel value to which an identifier identical with that assigned to the median value is assigned is selected as a median value of each channel; and subsequently, a median image is generated on the basis of the median value of each channel obtained for each pixel.

11 Claims, 25 Drawing Sheets

(51) Int. Cl.
    *G06T 5/20* (2006.01)
    *G06T 5/00* (2006.01)
    *H04N 9/64* (2006.01)

(52) U.S. Cl.
    CPC ........... *G06T 2207/10016* (2013.01); *G06T 2207/10024* (2013.01); *G06T 2207/20032* (2013.01); *G06T 2207/20182* (2013.01); *G06T 2207/20216* (2013.01); *G06T 2207/30232* (2013.01)

(56) References Cited

U.S. PATENT DOCUMENTS

| | | | | |
|---|---|---|---|---|
| 8,340,406 | B1* | 12/2012 | Wang | G06K 9/38 382/128 |
| 2005/0215897 | A1* | 9/2005 | Sakaguchi | G06T 5/002 600/437 |
| 2008/0247462 | A1* | 10/2008 | Demos | H04N 19/597 375/240.03 |
| 2010/0141806 | A1 | 6/2010 | Uemura et al. | |
| 2012/0154579 | A1* | 6/2012 | Hampapur | G06T 7/2006 348/143 |
| 2013/0272606 | A1* | 10/2013 | Nakamura | G06K 9/4652 382/167 |

FOREIGN PATENT DOCUMENTS

| | | |
|---|---|---|
| JP | 2008-131609 | 6/2008 |
| WO | 2008/111549 | 9/2008 |

OTHER PUBLICATIONS

Search report from PCT/JP2013/005723, mail date is Dec. 24, 2013.
Search Report issued by E.P.O. patent office in E.P.O. Patent Application No. 13840385.2, dated Oct. 7, 2015.
Krzysztof Okarma: "Assessment of the spatio-temporal vector median filtering algorithms using colour video quality metrics", Poznan University of Technology Academic Journals: Computer Applications in Electrical Engineering, Sep. 2011, pp. 200-212, XP055211695, Retrieved from the Internet: URL:http://www.iee.put.poznan.pl/wydawnictwa/archiwum/ArtSzczegoly.aspx?ArtId=1398.
Astola J et al. "Vector Median Filters", Proceedings of the IEEE, IEEE, New York, US, vol. 78, No. 4, Apr. 1, 1990, pp. 678-689, XP000138458.
Hase H et al: "Real—time snowfall noise elimination", Image Processing, 1999. ICIP 99. Proceedings. 1999 International Conference on—Kobe, Japan Oct. 24-28, 1999, IEEE, Piscataway, NJ, USA, vol. 2, Oct. 24, 1999, pp. 406-409, XP010368992.
Peter C Barnum et al: "Analysis of Rain and Snow in Frequency Space", International Journal of Computer Vision, Kluwer Academic Publishers, BO, vo. 86, No. 2-3, Jan. 28, 2009, pp. 256-274, XP019775279.

* cited by examiner

IMAGE PROCESSING DEVICE AND IMAGE PROCESSING METHOD

TECHNICAL FIELD

The present invention relates to an image processing device and an image processing method that perform median processing in the time direction on multiple temporally consecutive captured images.

BACKGROUND ART

When a monitoring camera for capturing images of an object(s) outdoors performs image capturing during a snowfall, the object(s) to be monitored may be obscured by many snow particles and can be unclear in the images captured. Such noise appearing in the captured image due to snow particles (hereinafter referred to as snowfall noise) hinders the monitoring, and thus, should be removed from the captured images.

To meet such a demand, technology is proposed in which median processing in the time direction is performed on multiple temporally consecutive captured images to remove the snowfall noise (see Patent Document 1 and Non-Patent Document 1). This technology is based on the fact that the probability that a pixel at the same coordinate represents a snow particle in multiple temporally consecutive captured images is low, and by performing median processing in the time direction, in which pixel values extracted from multiple temporally consecutive captured images are rearranged in the order of magnitude to obtain a median value, it is possible to remove the pixel values representing snow particles, thereby removing the snowfall noise.

PRIOR ART DOCUMENT(S)

Patent Document(S)

Patent Document 1: JP2000-115763A

Non-Patent Document(S)

Non-Patent Document 1: Miyake et al., "Snowfall Noise Elimination Using a Time Median Filter," The Journal of the Institute of Image Electronics Engineers of Japan, Vol. 30, No. 3, 2001, P 251-259

SUMMARY OF THE INVENTION

Task to be Accomplished by the Invention

However, in the aforementioned conventional technology, when median processing is performed on color images, a median value of each of the multiple channels is obtained by sorting the pixel values of each channel independently, and thus, as the image size increases, the amount of computation for the median processing becomes enormous, and this prevents increase of the processing speed.

The present invention is made to solve such problems in the prior art technology, and a primary object of the present invention is to provide an image processing device and an image processing method configured to be able to increase the processing speed when median processing in the time direction is performed on color images.

Means to Accomplish the Task

An image processing device according to the present invention is an image processing device for performing median processing in a time direction on a plurality of temporally consecutive input images, the device including: a pixel value extraction unit that extracts pixel values of a pixel of interest from the plurality of input images; a pixel value selection unit that rearranges a plurality of pixel values of a certain channel extracted for the pixel of interest by the pixel value extraction unit and selects a pixel value corresponding to a predetermined position after rearrangement; a pixel value obtaining unit that obtains a pixel value of another channel in the input image corresponding to the pixel value selected by the pixel value selection unit; and an output pixel value determination unit that, based on the pixel values obtained by the pixel value selection unit and the pixel value obtaining unit, determines an output pixel value of the pixel of interest.

Further, an image processing method according to the present invention is an image processing method for performing median processing in a time direction on a plurality of temporally consecutive input images, the method including: a step of extracting pixel values of a pixel of interest from the plurality of input images; a step of rearranging a plurality of pixel values of a certain channel extracted by the step of extracting pixel values and selecting a pixel value corresponding to a predetermined position after rearrangement; a step of obtaining a pixel value of another channel in the input images corresponding to the pixel value selected by the step of selecting a pixel value; and a step of determining, based on the pixel values obtained by the step of selecting a pixel value and the step of obtaining a pixel value, an output pixel value of the pixel of interest.

Effect of the Invention

According to the present invention, rearrangement of the pixel values is only required to be performed on the pixel values of one channel of the multiple channels, and thus, it is possible to increase the speed of the median processing. Further, each obtained combination of pixel values of the multiple channels is actually present in one of the original captured images, and thus, an appropriate median image can be obtained.

DESCRIPTION OF THE PREFERRED EMBODIMENT(S)

Figure 1:
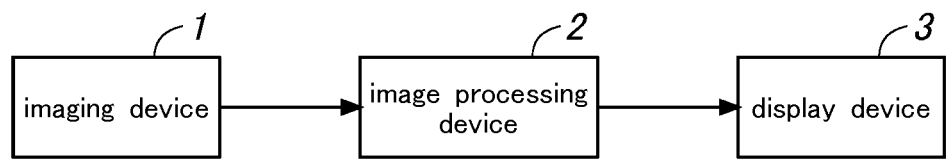
FIG. 1 is an overall configuration diagram showing an imaging system according to the first embodiment.

In a first aspect of the present invention made to achieve the above object, there is provided an image processing device for performing median processing in a time direction on a plurality of temporally consecutive input images, the device including: a pixel value extraction unit that extracts pixel values of a pixel of interest from the plurality of input images; a pixel value selection unit that rearranges a plurality of pixel values of a certain channel extracted for the pixel of interest by the pixel value extraction unit and selects a pixel value corresponding to a predetermined position after rearrangement; a pixel value obtaining unit that obtains a pixel value of another channel in the input image corresponding to the pixel value selected by the pixel value selection unit; and an output pixel value determination unit that, based on the pixel values obtained by the pixel value selection unit and the pixel value obtaining unit, determines an output pixel value of the pixel of interest.

According to this structure, rearrangement of the pixel values is only required to be performed on the pixel values of one channel of the multiple channels, and thus, it is possible to increase the speed of the median processing. Further, each obtained combination of pixel values of the multiple channels is actually present in one of the original captured images, and thus, an appropriate median image can be obtained.

Further, in a second aspect of the present invention, the image processing device further includes an identifier assignment unit that assigns identifiers corresponding to the plurality of input images to the pixel values extracted by the pixel value extraction unit, wherein the pixel value selection unit obtains an identifier assigned to the selected pixel value, and wherein the pixel value obtaining unit obtains the pixel value of the other channel based on the obtained identifier.

According to this structure, the process of picking, based on the pixel value of one channel obtained by rearranging of the pixel values, a pixel value of another channel can be simplified, and thus, the speed of the median processing can be increased even further.

Further, in a third aspect of the present invention, the image processing device further includes an output image generation unit that generates an output image based on the output pixel value obtained for each pixel. According to this structure, an output image, namely, a median image can be obtained.

Further, in a fourth aspect of the present invention, the image processing device further includes a display device that displays the output image. This structure enables the output image, namely, the median image to be checked visually.

Further, in a fifth aspect of the present invention, the pixel value selection unit selects a value at a middle position after the rearrangement as the predetermined position. It is to be noted that the pixel value to be obtained is not limited to the median value, and may be a value close to the median value.

Further, in a sixth aspect of the present invention, the input images are images captured by the imaging device.

Further, in a seventh aspect of the present invention, the pixel value extraction unit obtains pixel values of each of R, G and B channels from the input images, and the pixel value selection unit rearranges the pixel values of the G channel.

According to this structure, because the rearrangement is performed based on the pixel value of the G channel having characteristics close to those of brightness which is effective in determining whether a pixel value represents a snow particle, it is possible to accurately remove the pixel values representing snow particles and to obtain a median image in which the snowfall noise has been properly removed.

Further, in an eighth aspect of the present invention, the pixel value extraction unit obtains pixel values of each of Y, U and V channels from the input images, and the pixel value selection unit rearranges pixel values of the Y channel.

According to this structure, because the rearrangement is performed based on brightness itself (pixel value of the Y channel) which is effective in determining whether a pixel value represents a snow particle, it is possible to accurately remove the pixel values representing snow particles and to obtain a median image in which the snowfall noise has been properly removed.

Further, in a ninth aspect of the present invention, the pixel value selection unit rearranges the plurality of pixel values in an order of magnitude.

Further, in a tenth aspect of the present invention, the input images those are captured during a snowfall, and the image processing device removes snowfall noise in the input images by performing the median processing in the time direction.

According to this structure, the snowfall correction process can be performed at a high speed.

Further, in an eleventh aspect of the present invention, there is provided an image processing method for performing median processing in a time direction on a plurality of temporally consecutive input images, the method including: a step of extracting pixel values of a pixel of interest from the plurality of input images; a step of rearranging a plurality of pixel values of a certain channel extracted by the step of extracting pixel values and selecting a pixel value corresponding to a predetermined position after rearrangement; a step of obtaining a pixel value of another channel in the input images corresponding to the pixel value selected by the step of selecting a pixel value; and a step of determining, based on the pixel values obtained by the step of selecting a pixel value and the step of obtaining a pixel value, an output pixel value of the pixel of interest.

According to this structure, as in the aforementioned first aspect of the present invention, the speed of the median processing can be increased and an appropriate median image can be obtained.

Further, in a twelfth aspect of the present invention, the image processing device further includes: a motion determination unit that determines whether the pixel of interest is a pixel in motion; an object determination unit that, when it is determined by the motion determination unit that the pixel of interest is a pixel in motion, determines whether the pixel of interest indicates predetermined noise or indicates other than the predetermined noise; and a corrected image generation unit that, when it is determined by the object determination unit that the pixel of interest indicates predetermined noise, uses the pixel value determined by the output pixel value determination unit, and when it is determined that the pixel of interest indicates other than the predetermined noise, uses a pixel value of the input image.

According to this structure, in a case where the pixel of interest represents noise (for example, due to small objects moving in the air) such as snowfall noise, the pixel value determined by the output pixel value determination unit, namely, the pixel value of the median image is adopted, and thus, the noise such as snowfall noise can be removed. Further, in a case where the pixel of interest indicates other than noise, a pixel value of the input image, namely, a pixel value of the captured image not subjected to the median processing is adopted, and thus, an afterimage generated when there is a pixel(s) in motion other than noise can be suppressed.

In the following, embodiments of the present invention will be described with reference to the drawings. It is to be noted that the embodiments may be used with each other so long as they do not contradict each other.

First Embodiment

FIG. 1 is an overall configuration diagram showing an imaging system according to the first embodiment. This imaging system includes an imaging device 1 that captures images of an object(s), an image processing device 2 that performs image processing on the frame images (captured images) obtained by the imaging device 1 and a display device 3 that displays processed images obtained by the image processing device 2. It is to be noted that the imaging device 1, the image processing device 2 and the display device 3 may be configured integrally or may be connected with each other via a communication network.

The imaging device 1 is used as a monitoring camera for capturing images of an object(s) outdoors. The image processing device 2 performs a snowfall correction process to remove snowfall noise generated in the frame images captured by the imaging device 1 during a snowfall. This is effective in monitoring, for example, the road situation (traffic volume, road surface state, etc.), train situation (rail road condition, railroad crossings, station premises), river flood situation, etc. during a snowfall.

It is to be noted that, other than the configuration in which the image data is input from the imaging device 1 to the image processing device 2 in real time, a configuration is also possible in which the image data obtained by the imaging device 1 is stored in an appropriate storage medium, and is read out from the storage medium so that the image processing device 2 performs image processing thereon. Further, the processed images obtained by the image processing device 2 may be output as still images or as moving images. Further, other than the configuration in which the image data is input from the image processing device 2 to the display device 3 in real time, a configuration is also possible in which the image data obtained by the image processing device 2 is stored in an appropriate storage medium, and is read out from the storage medium so that the display device 3 performs display based thereon.

Figure 2:
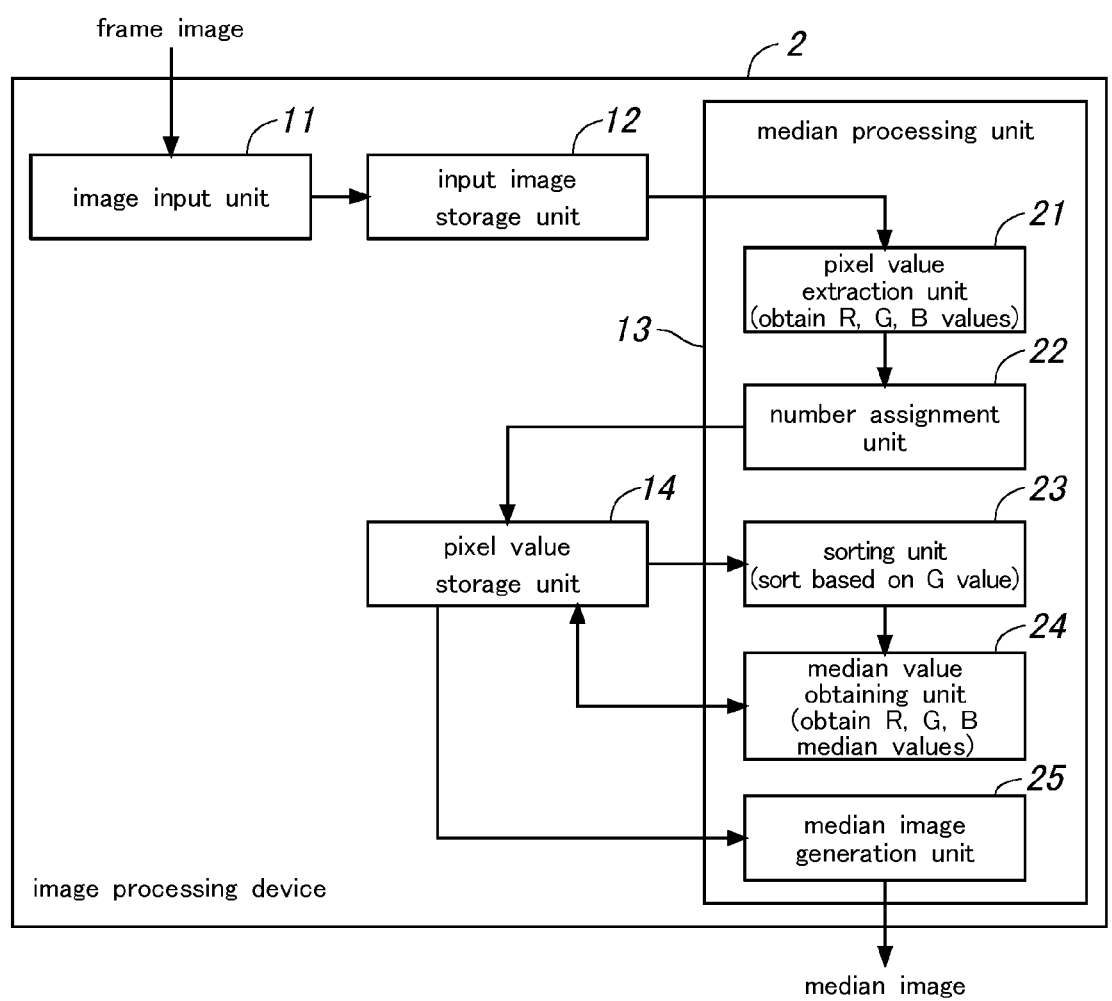
FIG. 2 is a block diagram showing a schematic structure of an image processing device 2 according to the first embodiment.

FIG. 2 is a block diagram showing a schematic structure of the image processing device 2 according to the first embodiment. The image processing device 2 includes an image input unit 11, an input image storage unit 12, a median processing unit 13 and a pixel value storage unit 14.

The image input unit 11 receives multiple temporally consecutive frame images input thereto. The input image storage unit 12 stores the multiple frame images input to the image input unit 11. The median processing unit 13 performs a snowfall correction process in which median processing is performed to remove the snowfall noise in the frame images. The pixel value storage unit 14 stores pixel values obtained by the median processing unit 13.

The median processing unit 13 performs median processing in the time direction on a predetermined number of frame images, and includes a pixel value extraction unit 21, a number assignment unit (identifier assignment unit) 22, a sorting unit (pixel value selection unit) 23, a median value obtaining unit (pixel value obtaining unit) 24 and a median image generation unit (output pixel value determination unit) 25. This median processing unit 13 is realized by executing a predetermined program by a CPU.

The pixel value extraction unit 21 performs a process of extracting, for a pixel of interest, pixel values of each channel from the multiple temporally consecutive frame images. Specifically, in this embodiment, frame images of RGB format are input to the image processing device 2, and the pixel value extraction unit 21 obtains R, G and B values (pixel values of R, G and B channels) from the frame images.

The number assignment unit (identifier assignment unit) 22 performs a process of assigning, to each pixel value of each channel obtained by the pixel value extraction unit 21, an index number (identifier) corresponding to the frame image from which the pixel value was extracted, namely, a process of associating each pixel value of each channel with an index number. Particularly, in this embodiment, each of R, G and B values is assigned an index number corresponding to the order of the frame images.

The sorting unit 23 performs a sorting process on a set of pixel values of one channel, namely, a process of rearranging the pixel values of one channel in the order of magnitude together with the index numbers and obtaining the index number assigned to the median value of the pixel values (middle position in the arrangement). Specifically, in this embodiment, G values are rearranged in the order of magnitude to obtain the index number assigned to the median value thereof. It is to be noted that the obtained pixel value is not limited to the median value, and may be a value close to the median value.

The median value obtaining unit 24 performs a process of selecting, as a median value of each channel, a pixel value to which an index number identical with that assigned to the median value obtained by the sorting unit 23 is assigned. Specifically, in this embodiment, a median value of each of R, G and B is selected based on the index number obtained by the sorting unit 23.

The median image generation unit 25 performs a process of generating a median image based on the median value of each channel obtained for each pixel by repeating, for all the pixels, the processes performed for the pixel of interest by the pixel value extraction unit 21, the number assignment unit 22, the sorting unit 23 and the median value obtaining unit 24. Specifically, in this embodiment, a median image is generated based on the median value of each of R, G and B.

It is to be noted that the pixel values obtained by the pixel value extraction unit 21 and the index numbers assigned by the number assignment unit 22 are stored in the pixel value storage unit 14, and each of the sorting unit 23, the median value obtaining unit 24 and the median image generation unit 25 reads out the pixel values and the index numbers from the pixel value storage unit 14 to perform a required process, and the pixel values obtained by the process performed by each unit are stored in the pixel value storage unit 14.

Figure 3:
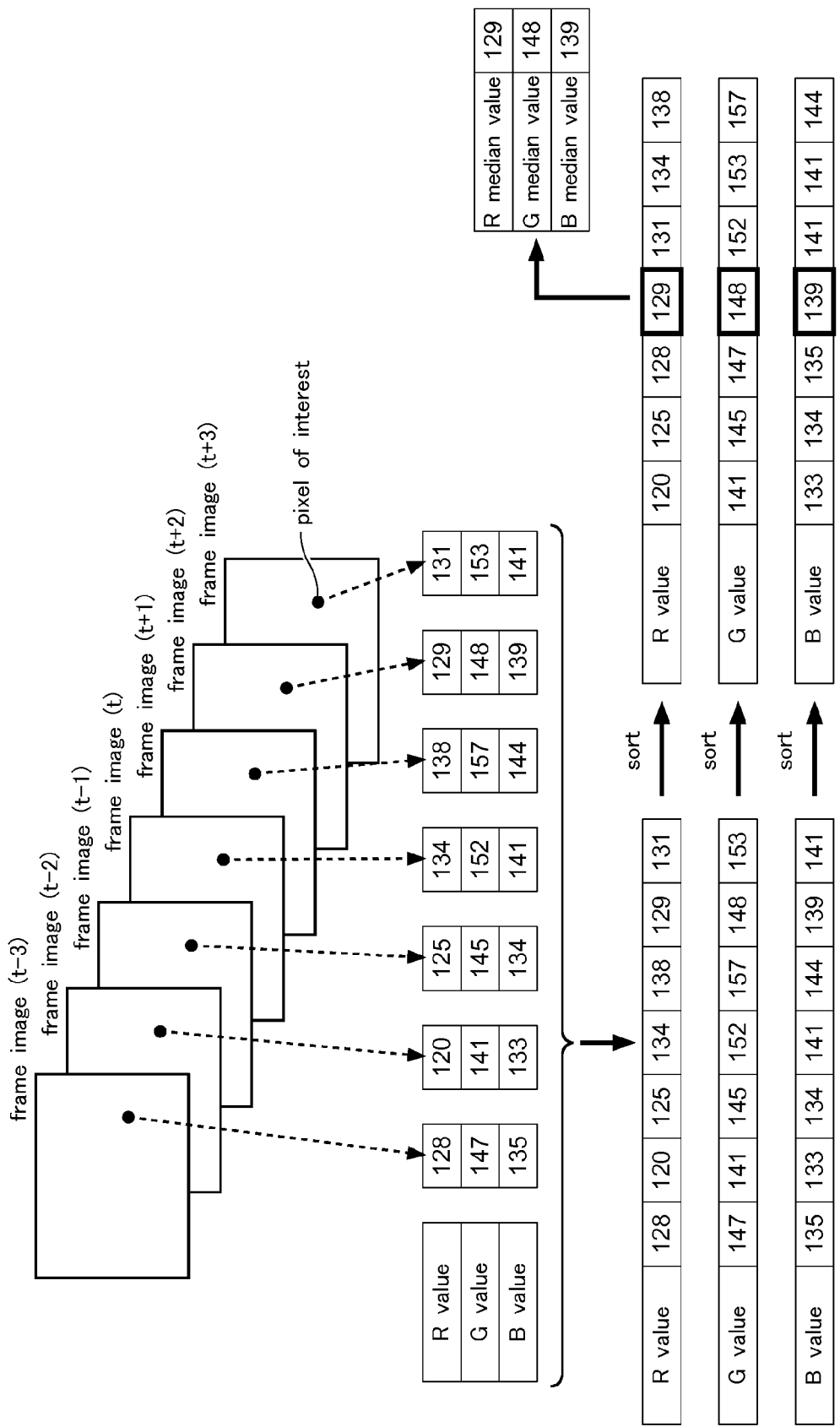
FIG. 3 is an explanatory diagram for explaining an overview of the median processing according to the conventional method.
Figure 4:
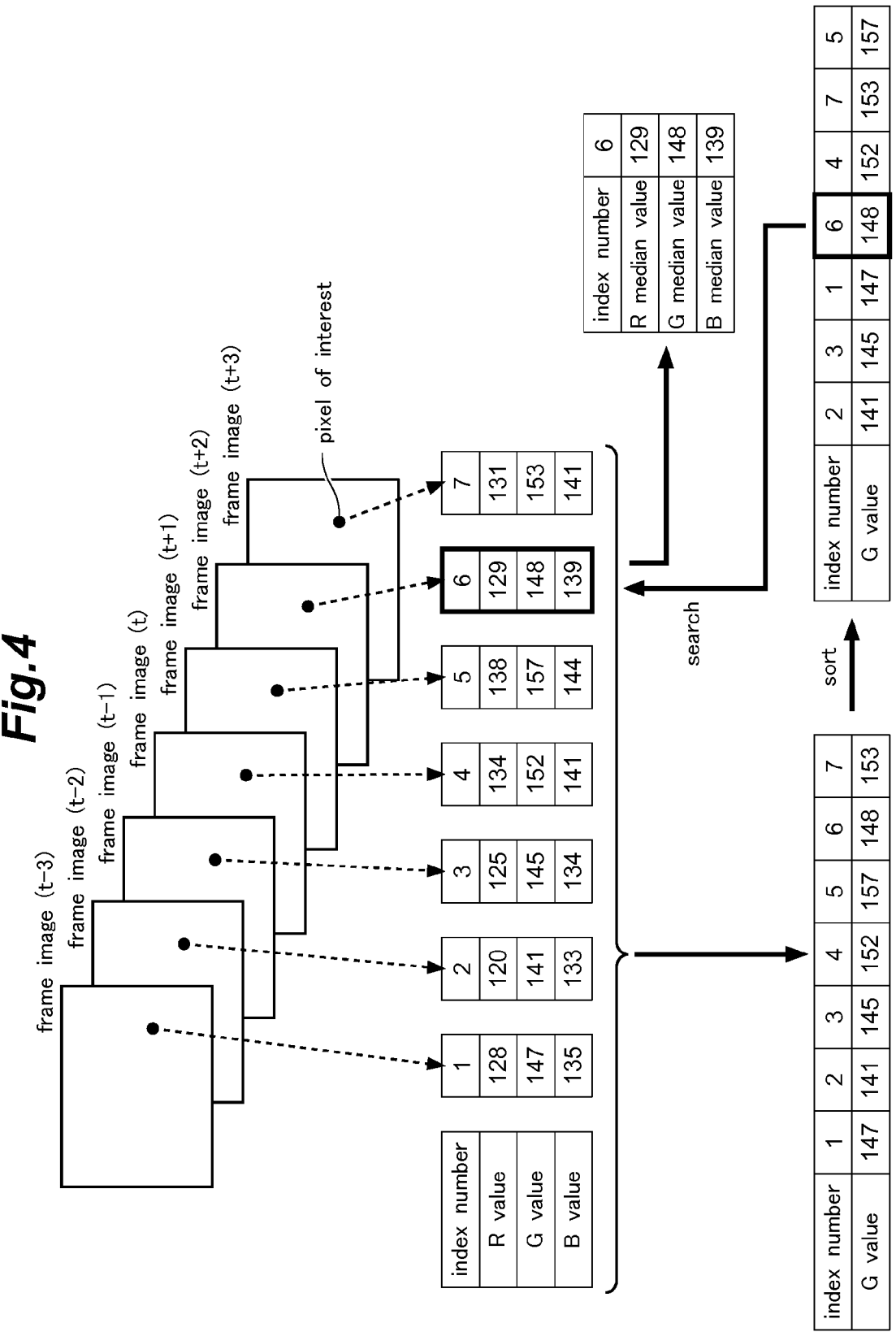
FIG. 4 is an explanatory diagram for explaining an overview of the median processing according to the first embodiment.

Now, the median processing according to the first embodiment will be described in comparison with a conventional method. FIG. 3 is an explanatory diagram for explaining an overview of the median processing according to the conventional method. FIG. 4 is an explanatory diagram for explaining an overview of the median processing according to the first embodiment.

Here, each of the R, G and B values (pixel value of each of R, G and B channels) may have a value from 0 to 255. The median processing is performed on a total of seven frame images including a frame image of interest (t) and three frame images preceding and subsequent thereto (t−3 to t−1 and t+1 to t+3). It is to be noted that the number of the frame images on which the median processing is performed is not limited to seven.

As shown in FIG. 3, in the median processing according to the conventional method, R, G and B values of the pixel of interest are obtained from each frame image, and a sorting process is performed on the obtained values of each of R, G and B to obtain a median value of each of R, G and B.

In this conventional method, since the sorting process is performed on the values of each of R, G and B, there is a problem that the sorting process takes time. Further, some combination of the obtained R, G and B median values may not match any combination of R, G and B values actually present in the original frame images.

In contrast, as shown in FIG. 4, in the median processing according to the first embodiment, each of the R, G and B values of the pixel of interest obtained from each frame image is assigned an index number (1 to 7) corresponding to the order of the frame images, and thereafter, a sorting process is performed on only the G values, in which the index numbers are also rearranged together with the G values. Then, an index number (in this example, "6") assigned to the G value in the middle of the order (G median value) is obtained, and R, G and B values assigned an index number identical with this index number are selected as the median values of R, G and B, respectively. It is to be noted that the channel on which the sorting is to be performed is not limited to the G channel, and may be the R or B channel. However, in the case of RGB images, the G channel is the most effective.

As described above, in the first embodiment, the sorting process is only required to be performed on the G values, and thus, the speed of the median processing can be increased. Particularly, because the sorting process is performed based on the G value having characteristics close to those of brightness which is effective in determining whether a pixel value represents a snow particle, it is possible to accurately remove the pixel values representing snow particles and to obtain a clear median image in which the snowfall noise has been properly removed. Further, it is ensured that each combination of the R, G and B median values obtained is actually present in one of the original frame images, and thus, an appropriate median image can be obtained.

Figure 5:
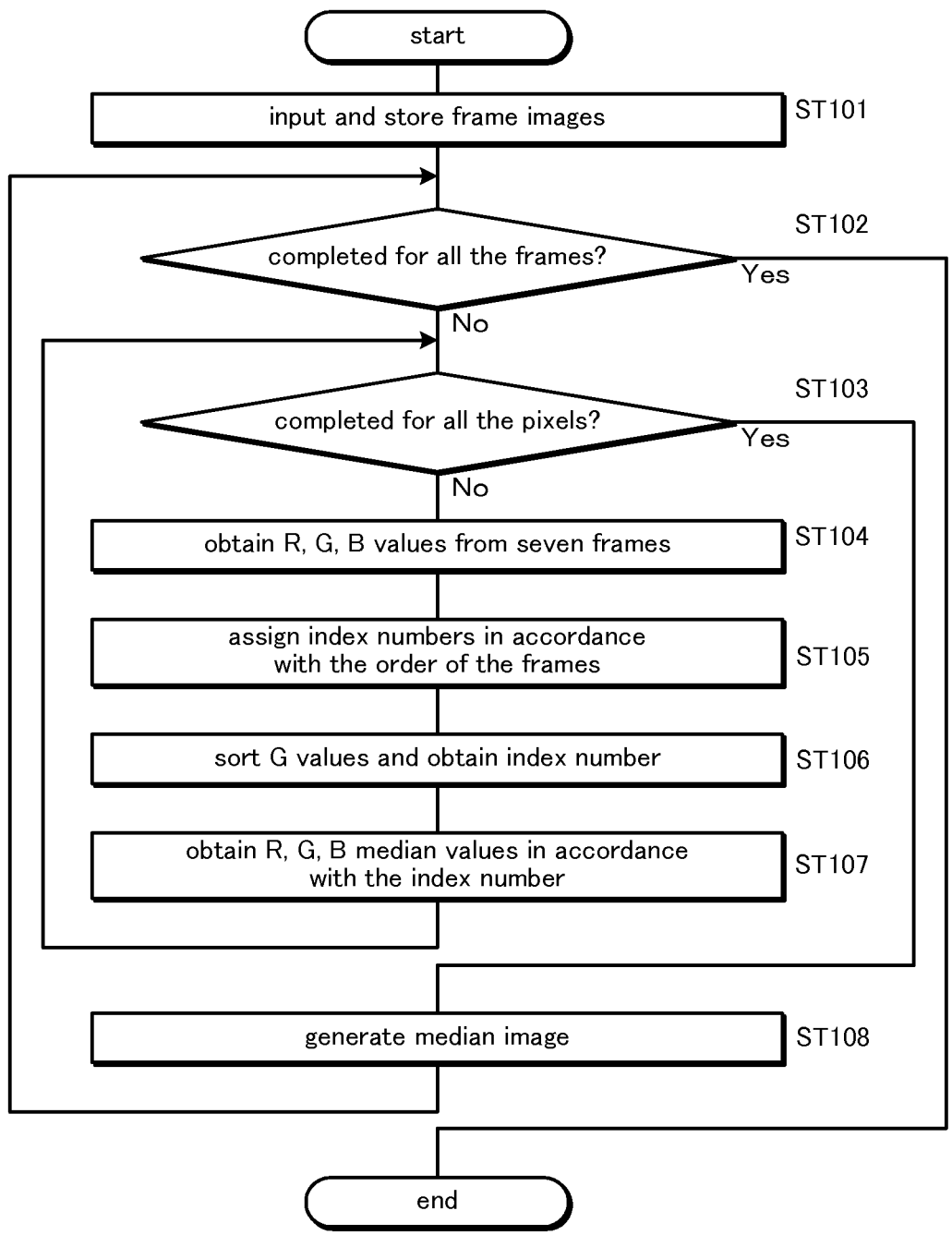
FIG. 5 is a flowchart showing a procedure of a process performed by the image processing device 2 according to the first embodiment.

FIG. 5 is a flowchart showing a procedure of a process performed by the median processing unit 13. In this procedure, first, multiple temporally consecutive frame images are input to the image input unit 11 and stored in the input image storage unit 12 (ST101). Then, following the determination on whether processing is completed for all the frame images (ST102) and whether processing is completed for all the pixels (ST103), processing for each pixel (ST104 to ST107) is performed.

In this processing for each pixel, first, the pixel value extraction unit 21 performs a process of obtaining R, G and B values of a pixel of interest from each of the seven frame images (ST104), and then, the number assignment unit 22 performs a process of assigning an index number to each of the R, G and B values (ST105). Subsequently, the sorting unit 23 performs a process of rearranging the G values in the order of magnitude and obtaining an index number assigned to the median value of the G values (ST106), and thereafter, the median value obtaining unit 24 performs a process of selecting, based on the index number obtained by the sorting unit 23, the median value of each of R, G and B (ST107).

Processing for one pixel is completed in this way, and this processing is repeated until the processing is completed for all the pixels in one frame image. Once the processing is completed for all the pixels in one frame image, the median image generation unit 25 performs a process of generating a median image based on the median value of each of R, G and B obtained for each pixel (ST108). Then, the foregoing processing is repeated until the processing is completed for all the frame images.

Second Embodiment

Figure 6:
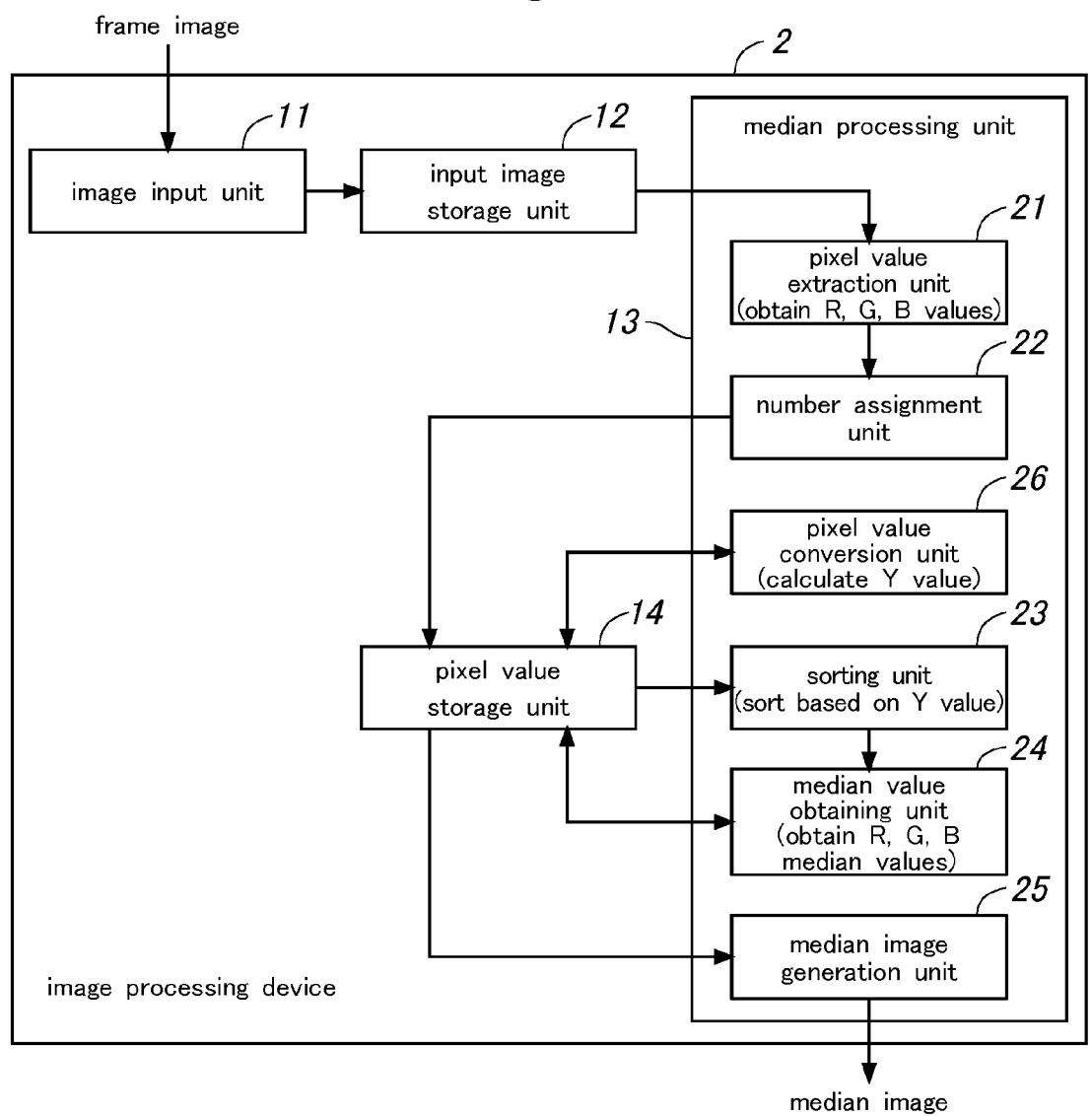
FIG. 6 is a block diagram showing a schematic structure of the image processing device 2 according to the second embodiment.
Figure 7:
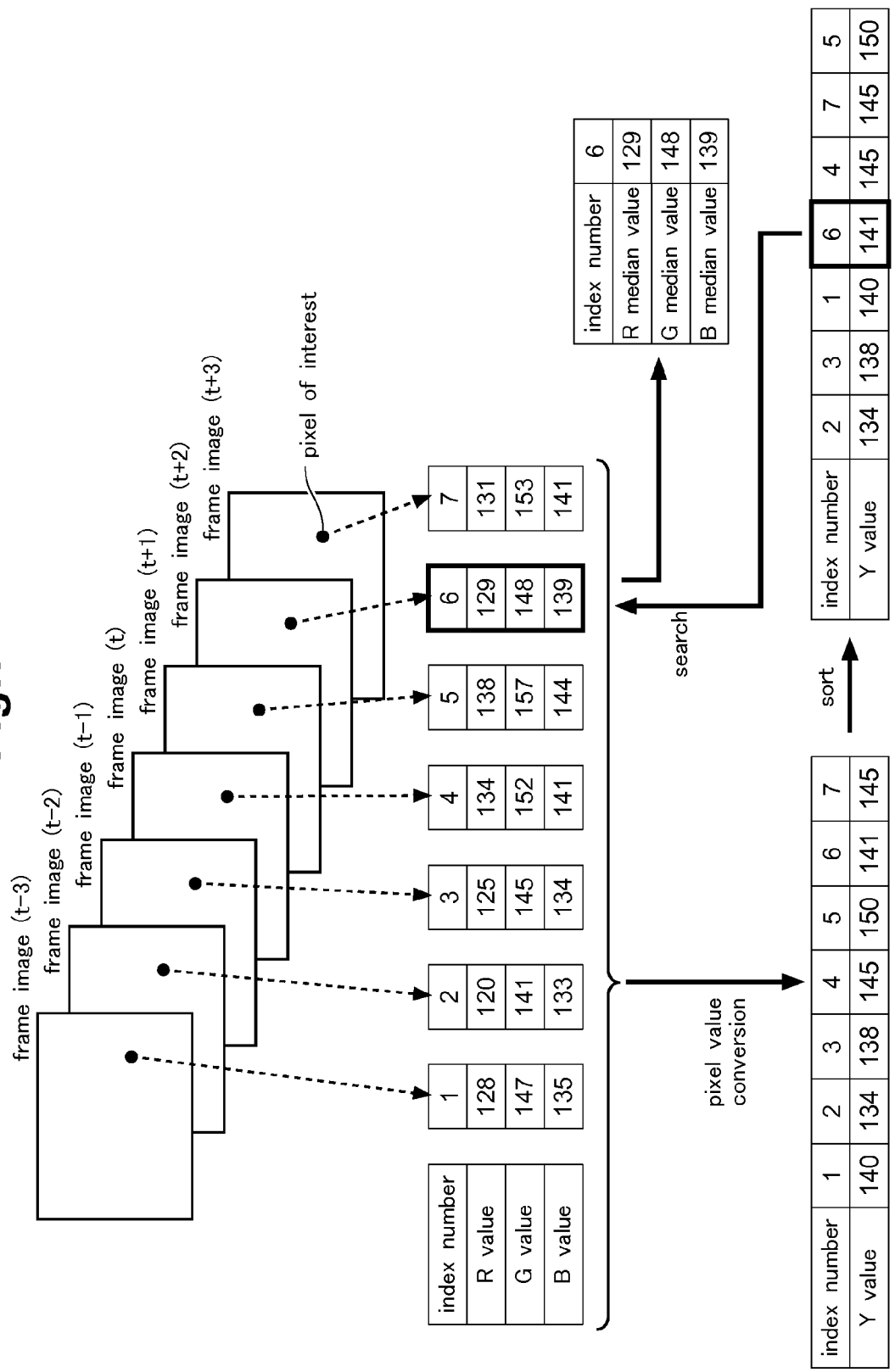
FIG. 7 is an explanatory diagram for explaining an overview of the median processing according to the second embodiment.
Figure 8:
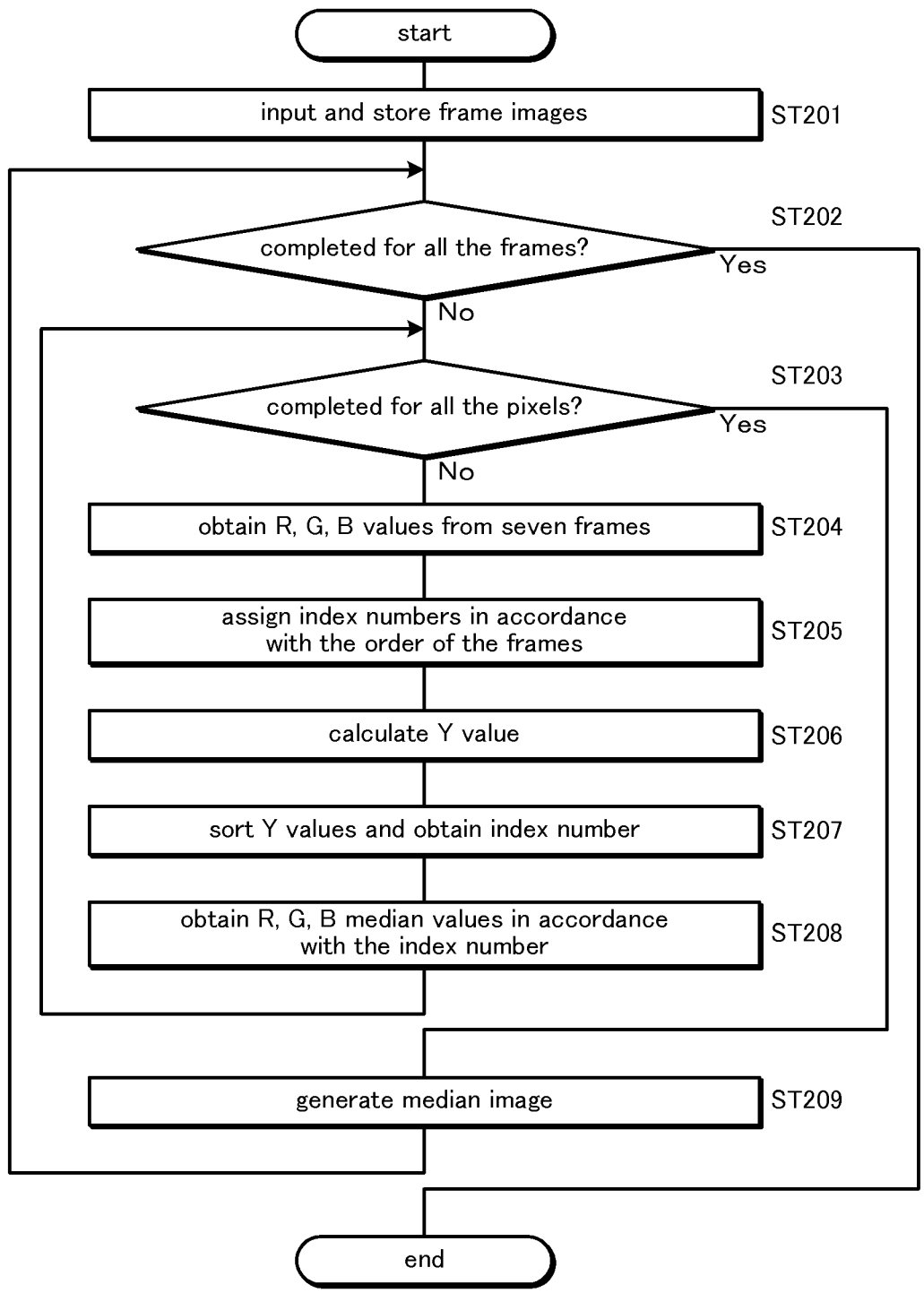
FIG. 8 is a flowchart showing a procedure of a process performed by the image processing device 2 according to the second embodiment.

FIG. 6 is a block diagram showing a schematic structure of the image processing device 2 according to the second embodiment. FIG. 7 is an explanatory diagram for explaining an overview of the median processing according to the second embodiment. FIG. 8 is a flowchart showing a procedure of a process performed by the image processing device 2 according to the second embodiment. It is to be noted that this embodiment is the same as the foregoing embodiment except for the points specifically mentioned here.

In the second embodiment, as shown in FIG. 6, the median processing unit 13 includes the pixel value extraction unit 21, the number assignment unit 22, the sorting unit 23, the median value obtaining unit 24 and the median image generation unit 25, as in the first embodiment described above. In the second embodiment, the median processing unit 13 further includes a pixel value conversion unit 26. This pixel value conversion unit 26 performs a process of calculating, from the pixel value of each channel obtained by the pixel value extraction unit 21, another pixel value.

Specifically, in the second embodiment, frame images of RGB format are input to the image processing device 2 as in the aforementioned first embodiment, and then, the pixel value conversion unit 26 performs a process of calculating a Y value (brightness) from the R, G and B values (ST206 in FIG. 8), as shown in FIG. 7. The Y value can be obtained by the following calculation formula:

$$Y=0.299R+0.587G+0.114B$$

Then, the sorting unit 23 performs a process of rearranging the Y values obtained by the pixel value conversion unit 26 in the order of magnitude and obtaining an index number assigned to the median value of the Y values (ST207 in FIG. 8). Subsequently, the median value obtaining unit 24 performs a process of selecting, based on the index number obtained by the sorting unit 23, the median value of each of R, G and B (ST208 in FIG. 8).

As described above, in the second embodiment, the sorting process is only required to be performed on the Y values (brightnesses), and thus, the speed of the median processing can be increased. The second embodiment needs the pixel value conversion process to calculate the Y values, and thus, an amount of computation may increase compared to the first embodiment correspondingly. However, because the sorting process is performed based on brightness itself which is effective in determining whether a pixel value represents a snow particle, it is possible to accurately remove the pixel values representing snow particles and to obtain a clear median image in which the snowfall noise has been properly removed.

Third Embodiment

Figure 9:
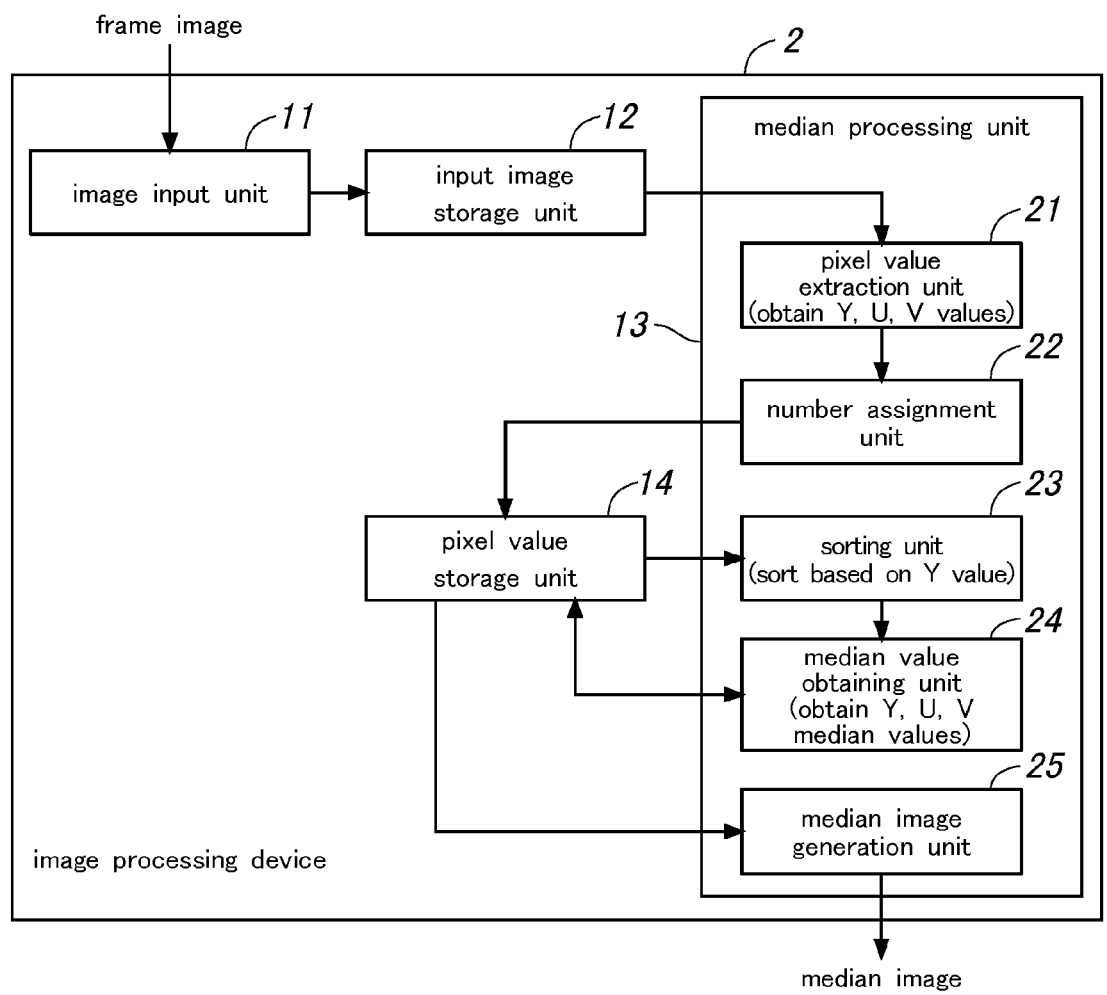
FIG. 9 is a block diagram showing a schematic structure of the image processing device 2 according to the third embodiment.
Figure 10:
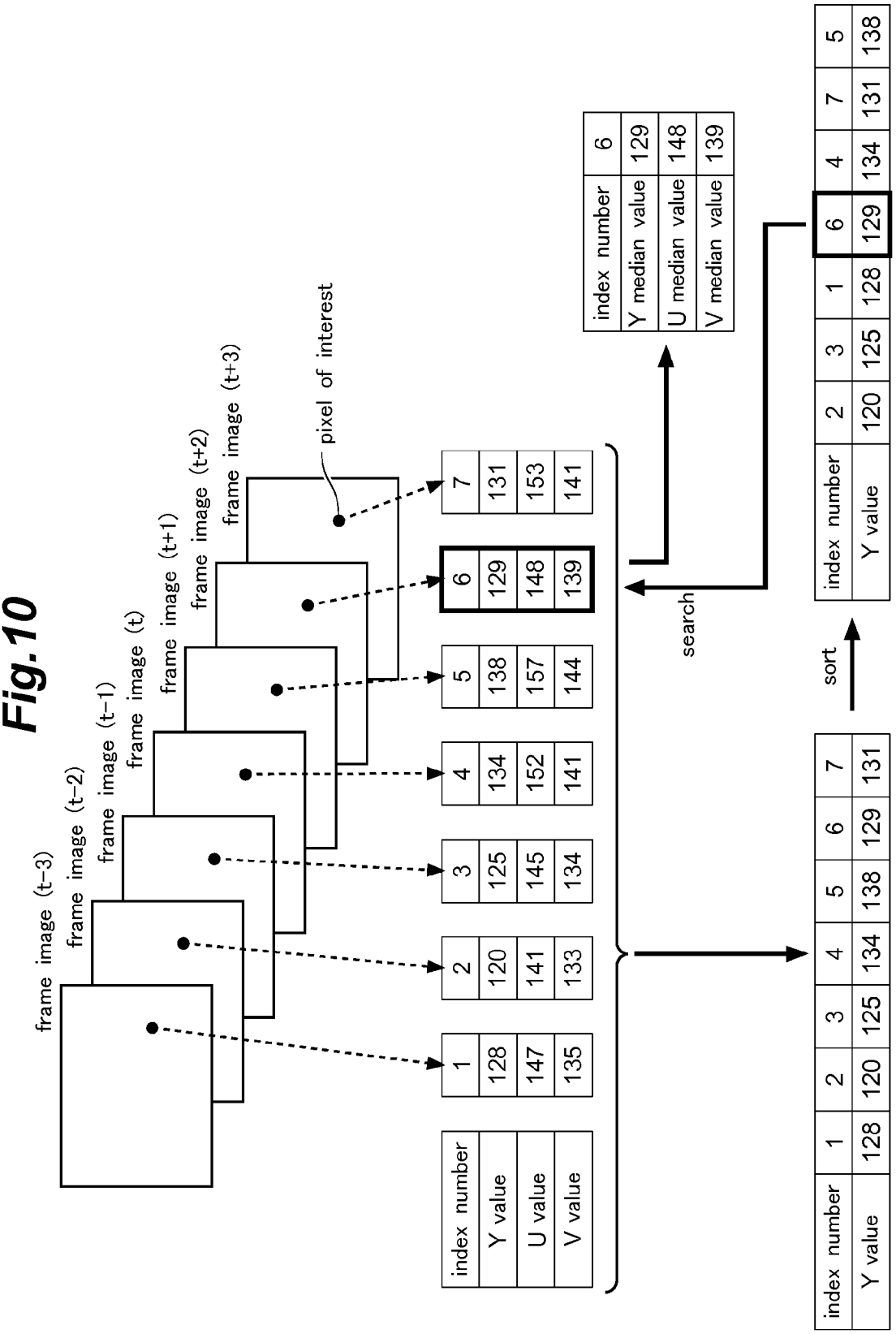
FIG. 10 is an explanatory diagram for explaining an overview of the median processing according to the third embodiment.
Figure 11:
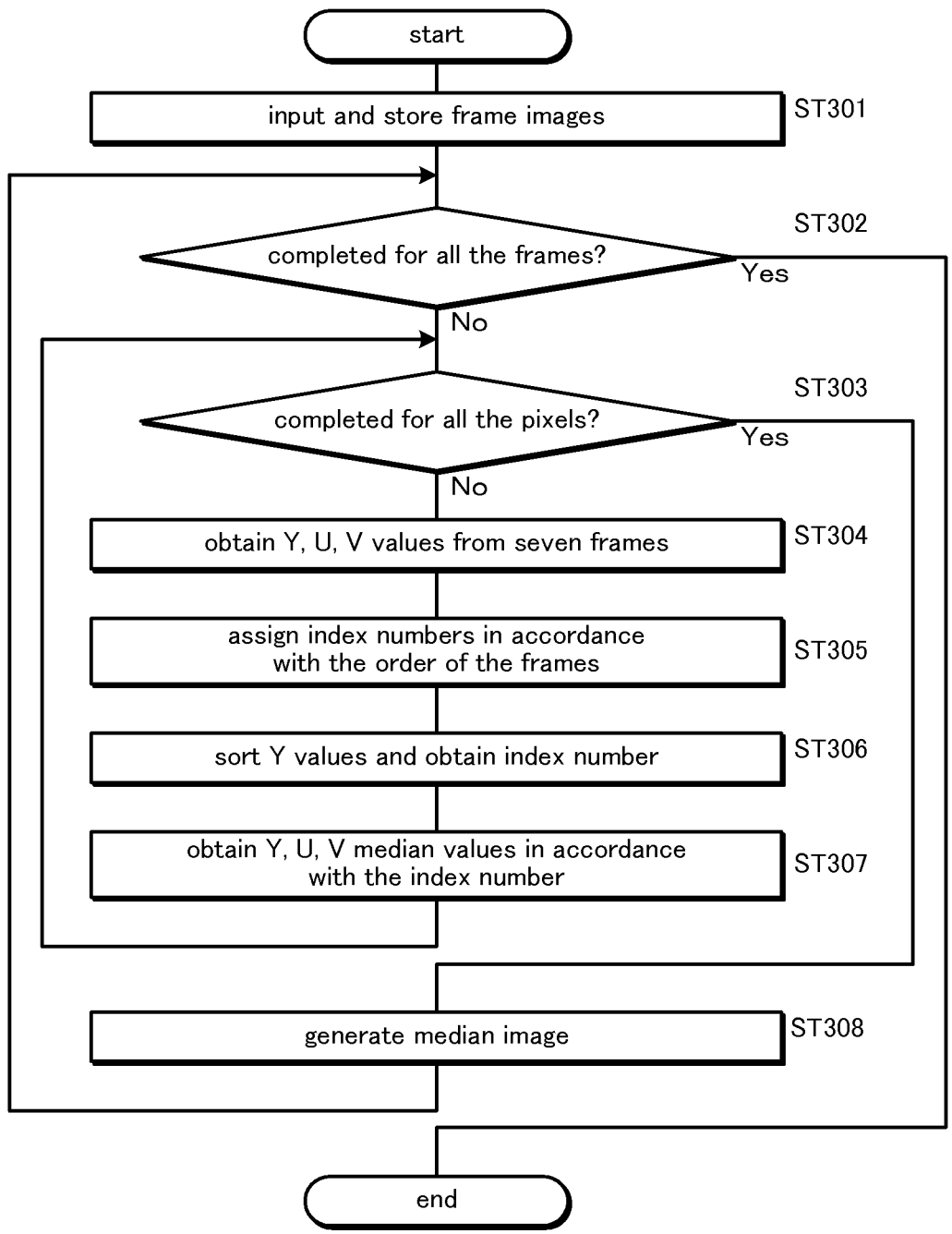
FIG. 11 is a flowchart showing a procedure of a process performed by the image processing device 2 according to the third embodiment.

FIG. 9 is a block diagram showing a schematic structure of the image processing device 2 according to the third embodiment. FIG. 10 is an explanatory diagram for explaining an overview of the median processing according to the third embodiment. FIG. 11 is a flowchart showing a procedure of a process performed by the image processing device 2 according to the third embodiment. It is to be noted that this embodiment is the same as the foregoing embodiment except for the points specifically mentioned.

In the third embodiment, as shown in FIG. 9, the median processing unit 13 includes the pixel value extraction unit 21, the number assignment unit 22, the sorting unit 23, the median value obtaining unit 24 and the median image generation unit 25, as in the first embodiment described above. In the third embodiment, frame images of YUV format are input to the image processing device 2, and the pixel value extraction unit 21 performs a process of obtaining Y, U and V values (pixel values of Y, U and V channels) from the frame images.

Then, as shown in FIG. 10, the sorting unit 23 performs a process of rearranging the Y values in the order of magnitude and obtaining an index number assigned to the median value of the Y values (ST306 in FIG. 11). Subsequently, the median value obtaining unit 24 performs a process of selecting, based on the index number obtained by the sorting unit 23, the median value of each of Y, U and V (ST307 in FIG. 11).

As described above, in the third embodiment, the sorting process is only required to be performed on the Y values (brightnesses), and thus, the speed of the median processing can be increased. Particularly, because the sorting process is performed based on brightness itself which is effective in determining whether a pixel value represents a snow particle, it is possible to accurately remove the pixel values representing snow particles and to obtain a clear median image in which the snowfall noise has been properly removed.

Fourth Embodiment

Figure 12:
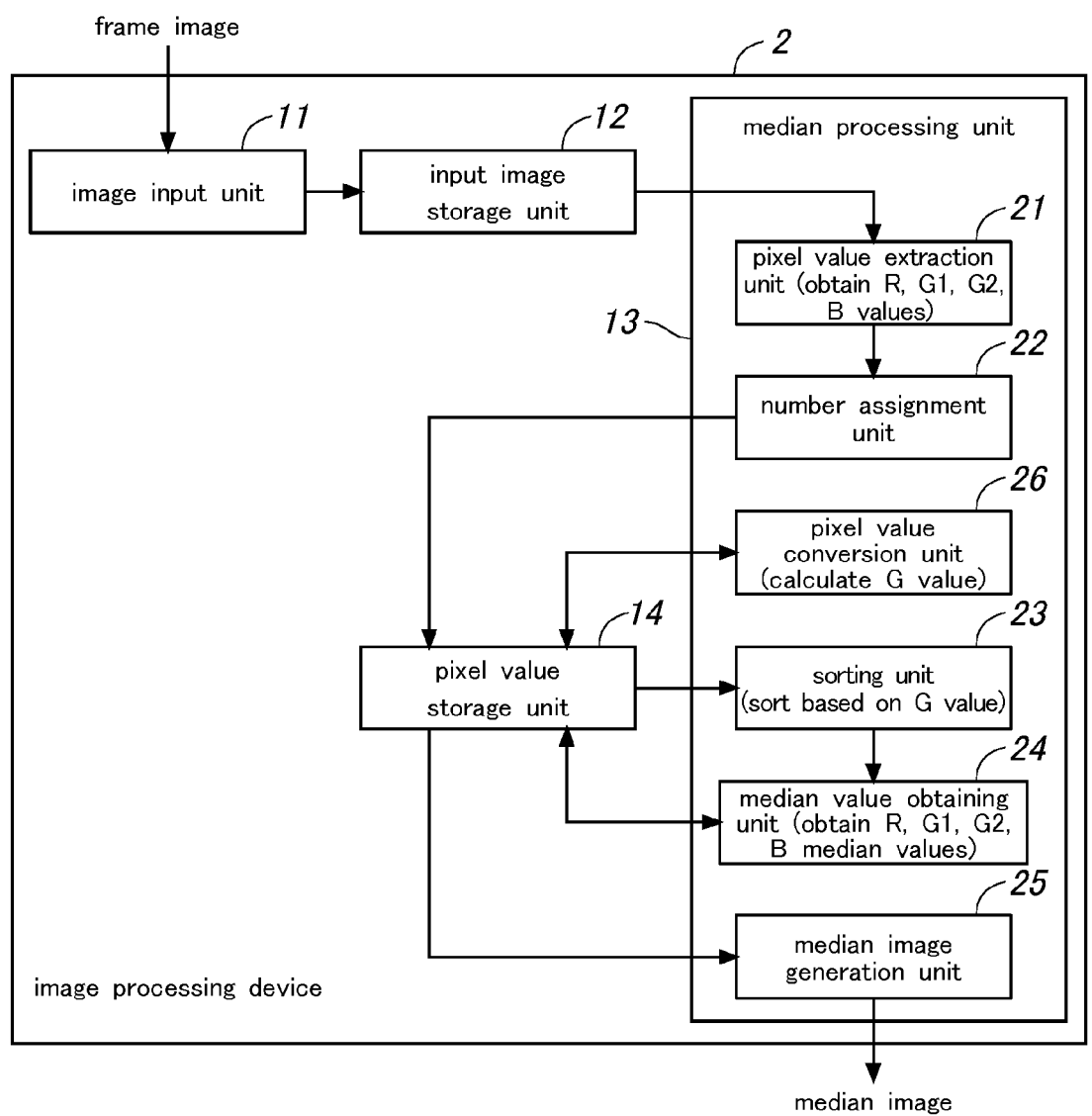
FIG. 12 is a block diagram showing a schematic structure of the image processing device 2 according to the fourth embodiment.
Figure 13:
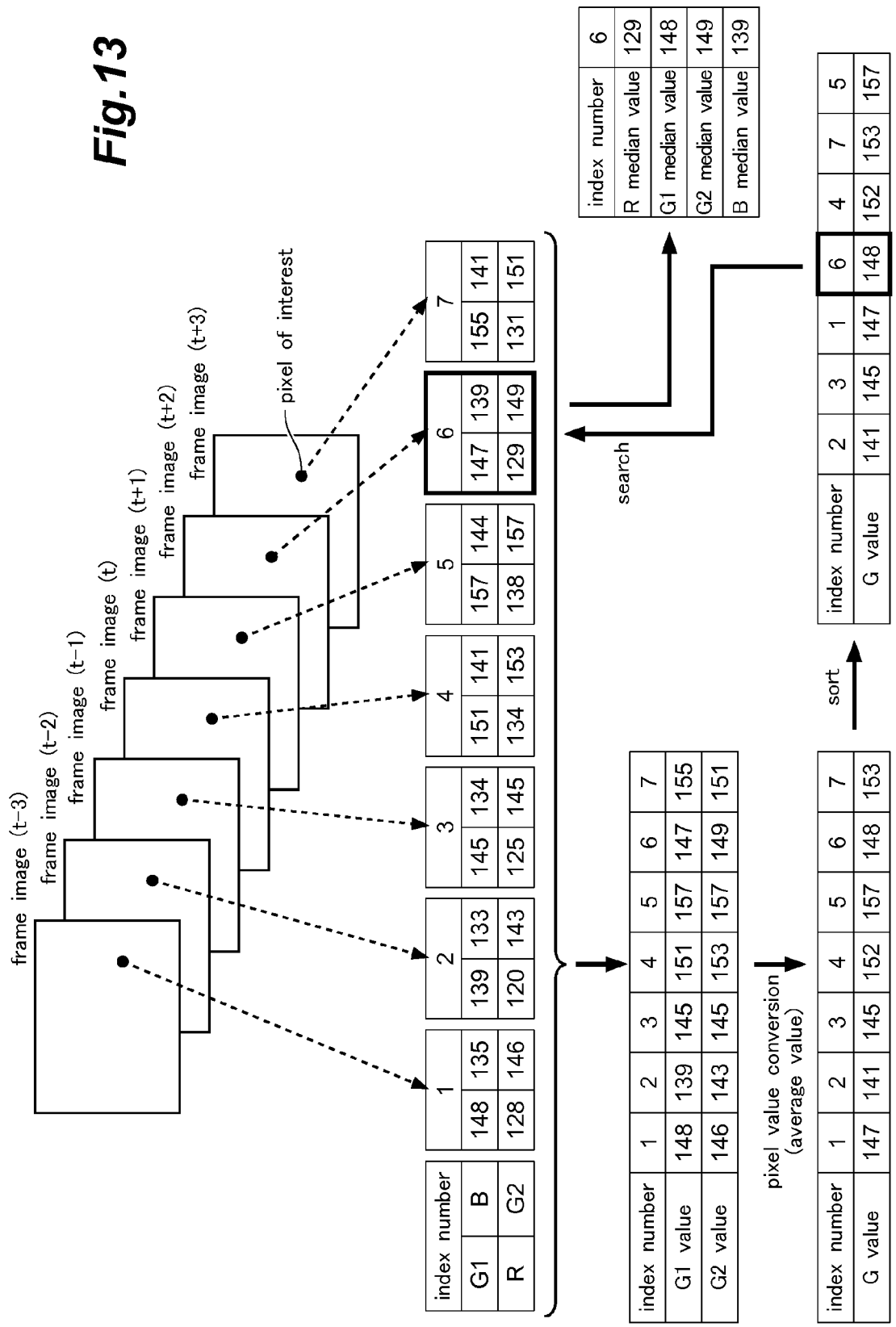
FIG. 13 is an explanatory diagram for explaining an overview of the median processing according to the fourth embodiment.
Figure 14:
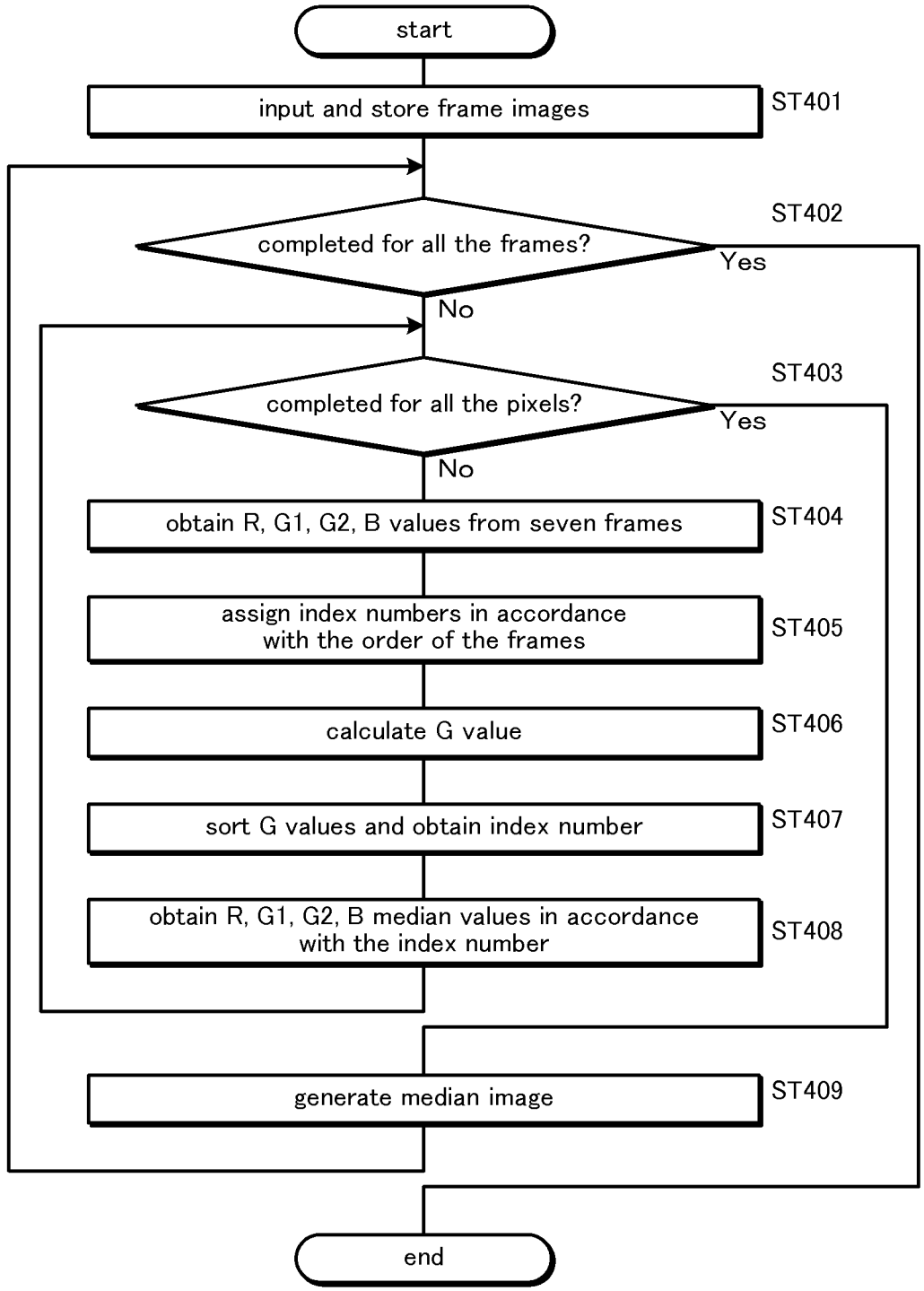
FIG. 14 is a flowchart showing a procedure of a process performed by the image processing device 2 according to the fourth embodiment.

FIG. 12 is a block diagram showing a schematic structure of the image processing device 2 according to the fourth embodiment. FIG. 13 is an explanatory diagram for explaining an overview of the median processing according to the fourth embodiment. FIG. 14 is a flowchart showing a procedure of a process performed by the image processing device 2 according to the fourth embodiment. It is to be noted that this embodiment is the same as the foregoing embodiment except for the points specifically mentioned.

In the fourth embodiment, as shown in FIG. 12, the median processing unit 13 includes the pixel value extraction unit 21, the number assignment unit 22, the pixel value conversion unit 26, the sorting unit 23, the median value obtaining unit 24 and the median image generation unit 25, as in the second embodiment described above. In the fourth embodiment, frame images of RAW format according to Bayer pattern are input to the image processing device 2, and the pixel value extraction unit 21 performs a process of obtaining R, G1, G2 and B values (pixel values of R, G1, G2 and B channels) from the frame images.

Then, as shown in FIG. 13, the pixel value conversion unit 26 performs a process of obtaining a G value as an average of each pair of the G1 value and the G2 value (ST406 in FIG. 14). Subsequently, the sorting unit 23 performs a process of rearranging the G values obtained by the pixel value conversion unit 26 in the order of magnitude and obtaining an index number assigned to the median value of the G values (ST407 in FIG. 14). Further, the median value obtaining unit 24 performs a process of selecting, based on the index number obtained by the sorting unit 23, the median value of each of R, G1, G2 and B (ST408 in FIG. 14).

As described above, in the fourth embodiment, the sorting process is only required to be performed on the G values, and thus, the computation load of the sorting process can be reduced. Further, though the pixel value conversion process for obtaining the G values is necessary, the overall amount of computation of the median processing is reduced compared to the case where the sorting process is performed to rearrange the values of each of R, G1, G2 and B independently, and thus, the speed of the median processing can be increased. Further, because the sorting process is performed based on the G value having characteristics close to those of brightness which is effective in determining whether a pixel value represents a snow particle, it is possible to accurately remove the pixel values representing snow particles and to obtain a clear median image in which the snowfall noise has been properly removed.

Fifth Embodiment

Figure 15:
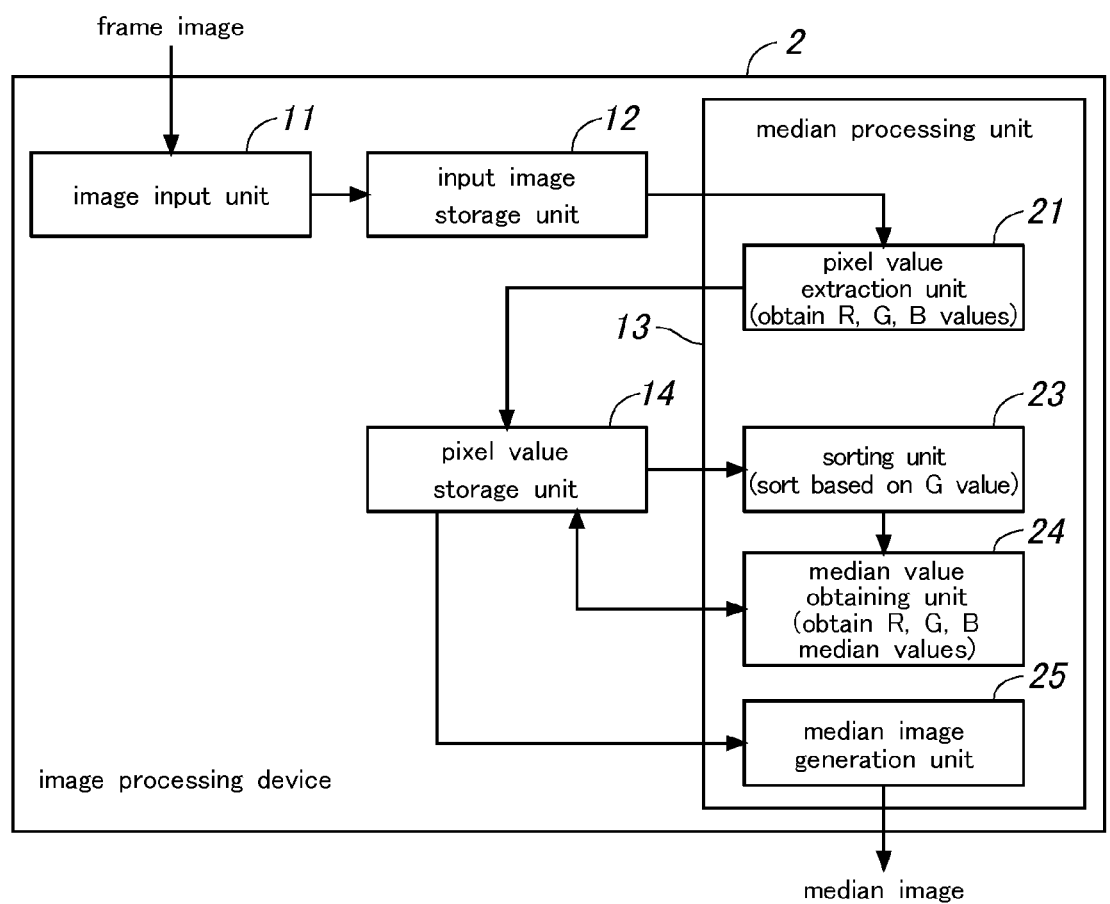
FIG. 15 is a block diagram showing a schematic structure of the image processing device 2 according to the fifth embodiment.
Figure 16:
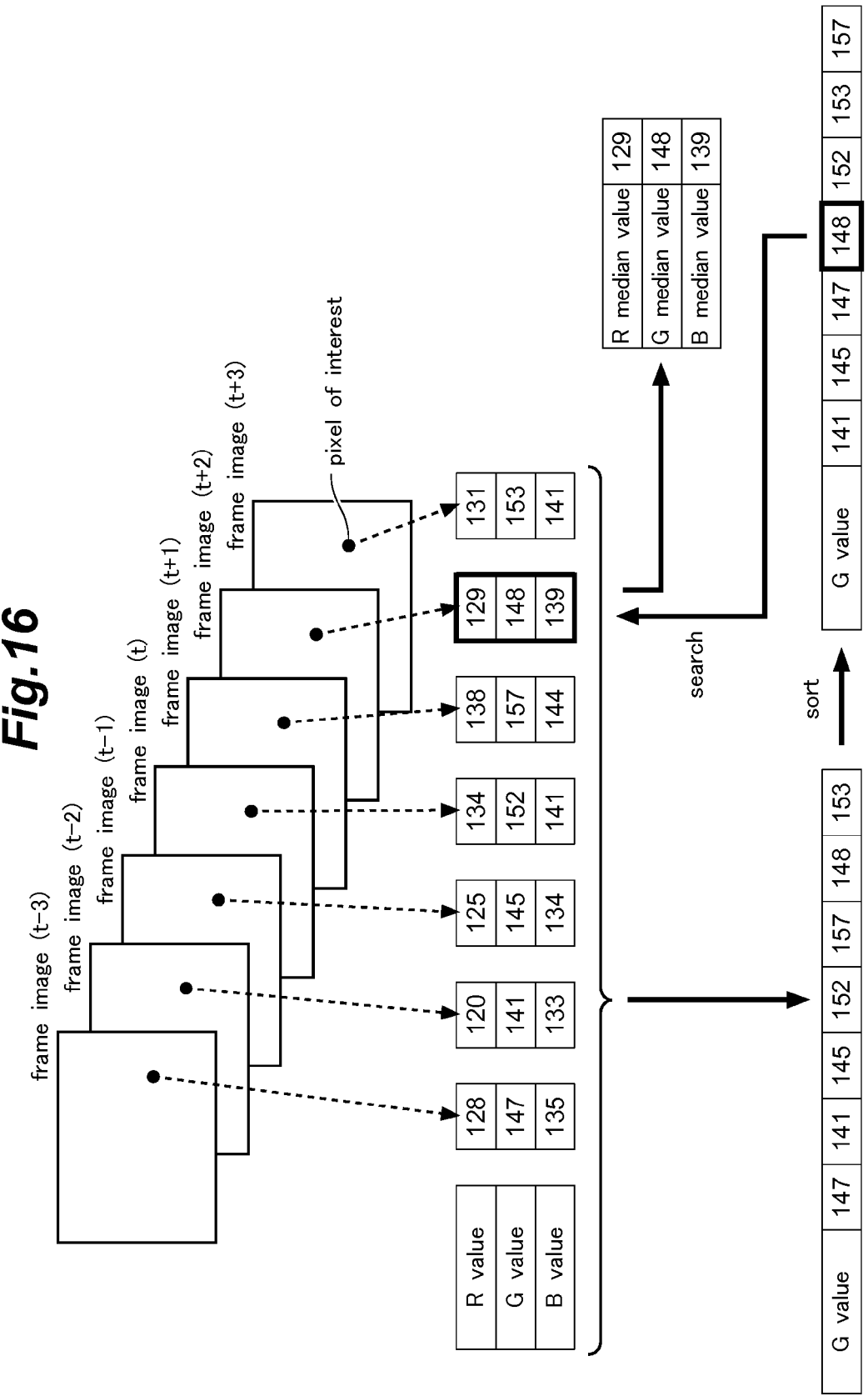
FIG. 16 is an explanatory diagram for explaining an overview of the median processing according to the fifth embodiment.
Figure 17:
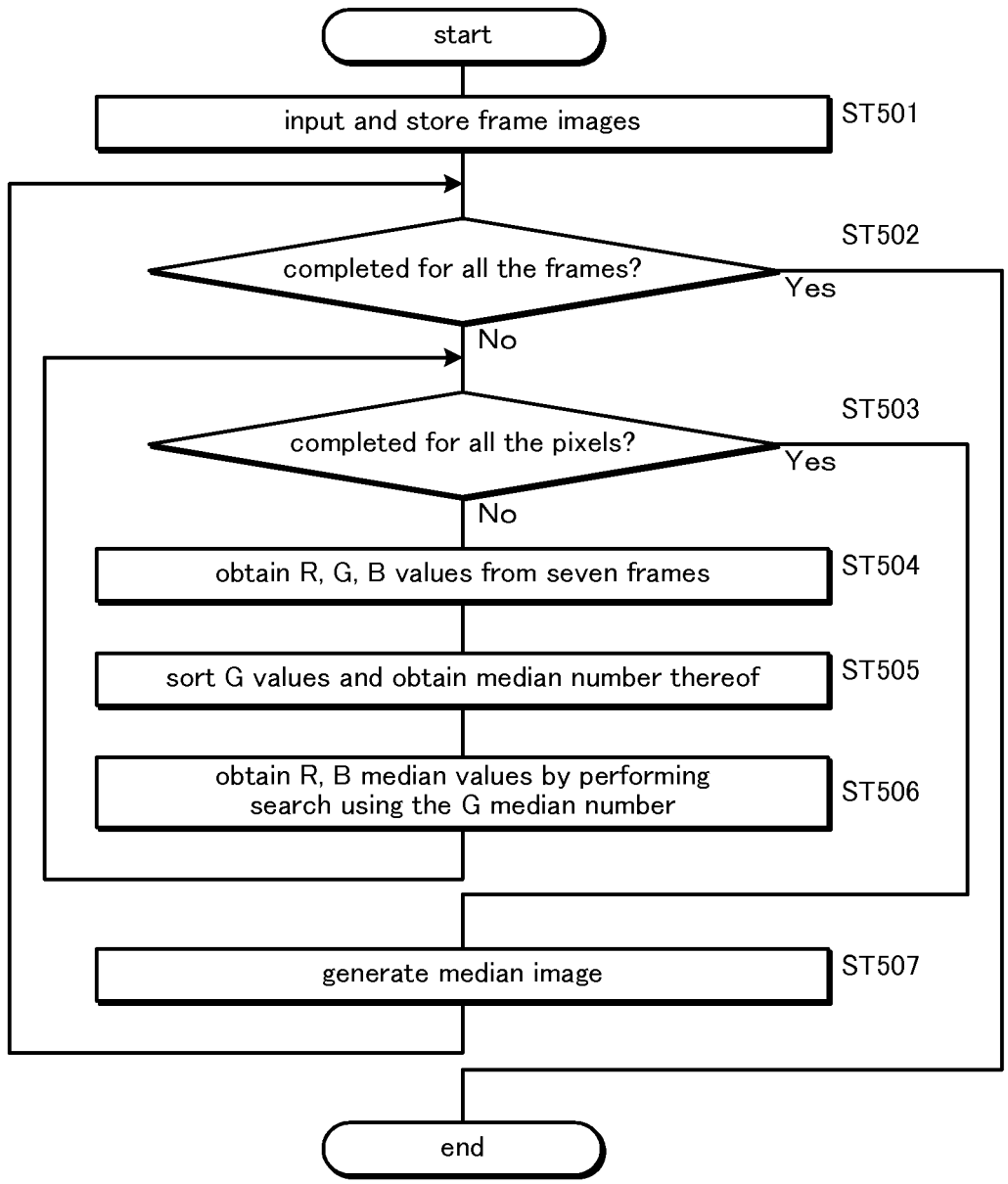
FIG. 17 is a flowchart showing a procedure of a process performed by the image processing device 2 according to the fifth embodiment.

FIG. 15 is a block diagram showing a schematic structure of the image processing device 2 according to the fifth embodiment. FIG. 16 is an explanatory diagram for explaining an overview of the median processing according to the fifth embodiment. FIG. 17 is a flowchart showing a procedure of a process performed by the image processing device 2 according to the fifth embodiment. It is to be noted that this embodiment is the same as the foregoing embodiment except for the points specifically mentioned here.

In the fifth embodiment, as shown in FIG. 15, the median processing unit 13 includes the pixel value extraction unit 21, the sorting unit 23, the median value obtaining unit 24 and the median image generation unit 25, as in the first embodiment described above. The fifth embodiment does not include the number assignment unit 22 of the first embodiment, and as shown in FIG. 16, the R, G and B values obtained by the pixel value extraction unit 21 are not assigned index numbers (identifiers) corresponding to the frame images from which they were extracted.

In this case, the sorting unit 23 performs a sorting process on the set of G values obtained by the pixel value extraction unit 21 to obtain the median value thereof (ST505 in FIG. 17), and then, the median value obtaining unit 24 performs a process of finding, from the combinations of pixel values in the frame images obtained by the pixel value extraction unit 21, a combination of pixel values including a G value matching the G median value obtained by the sorting unit 23, and regarding the found combination of pixel values as the median values of R, G and B (ST506 in FIG. 17).

In some cases, there may be multiple combinations of pixel values that include a G value matching the G median value obtained by the sorting unit 23. In such a case, the combination of pixel values found first in the search for a combination of pixel values including a G value matching the G median value may be selected as the median values, where the search is conducted in a certain order. It is also possible to randomly select one of the combinations of pixel values found in the search.

In the fifth embodiment, the R, G and B values obtained by the pixel value extraction unit 21 are stored in the pixel value storage unit 14 and the search is performed on the stored R, G and B values to find a combination of pixel values including a G value matching the G median value obtained by the sorting unit 23. However, it is also possible to perform the search on the frame images themselves. In this case, by extracting a G value from each frame image and comparing the G value with the G median value obtained by the sorting unit 23 to determine whether they match each other, a frame image including a G value matching the G median value obtained by the sorting unit 23 is identified, and then, the R and B values are extracted from this frame image so that they are regarded as the median values of R and B, respectively.

As described above, in the fifth embodiment, even though the pixel values obtained by the pixel value extraction unit 21 are not assigned index numbers (identifiers), the median value of each of R, G and B can be obtained based on the median value obtained by performing a sorting process on the pixel values of one channel.

Sixth Embodiment

Figure 18:
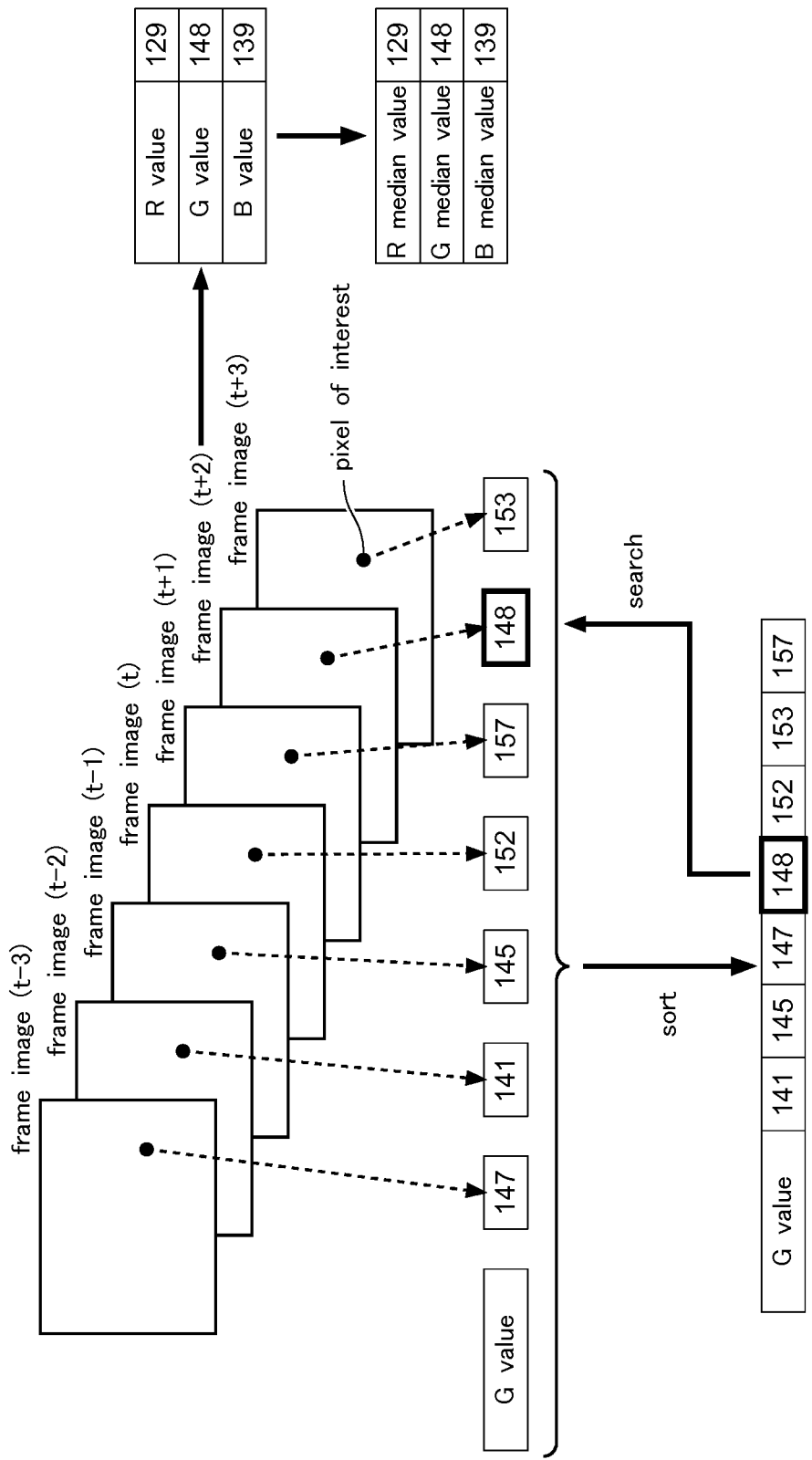
FIG. 18 is an explanatory diagram for explaining an overview of the median processing according to the sixth embodiment.

FIG. 18 is an explanatory diagram for explaining an overview of the median processing according to the sixth embodiment. It is to be noted that this embodiment is the same as the foregoing embodiment except for the points specifically mentioned here.

The schematic structure of the image processing device 2 in the sixth embodiment is the same as that in the fifth embodiment shown in FIG. 15. In this embodiment, the pixel value extraction unit 21 is configured to extract only the G values on which the sorting process is to be performed. The median value obtaining unit 24 searches for a frame image including a G value matching the G median value obtained by the sorting unit 23, extracts the R and B values from the frame image found, and regards them as the median values of R and B, respectively.

In the sixth embodiment, as in the fifth embodiment, there may be multiple frame images that include a G value matching the G median value obtained by the sorting unit 23. In such a case, the pixel values in the frame image found first in the search for a frame image including a G value matching the G median value may be selected as the median values, where the search is conducted in a certain order. It is also possible to randomly select one of the frame images found in the search.

As described above, in the sixth embodiment, the pixel value extraction unit 21 is required to extract only the G values on which the sorting process is to be performed, and does not have to extract the pixel values of all the channels from all the frame images of interest, and therefore, an amount of processing relating to the pixel value extraction process can be reduced.

In the sixth embodiment, as in the fifth embodiment, the process of assigning index numbers (identifiers) to the pixel values is not performed, and the G values are not associated with the frame images from which the G values were extracted, and therefore, in order to find a frame image including a G value matching the G median value obtained by the sorting process, it is necessary to perform a process of extracting the G values again from the frame images. If the assignment of the numbers is performed, namely, the G values obtained by the pixel value extraction unit 21 are assigned index numbers (identifiers) corresponding to the frame images from which they were extracted, a frame image including a G value matching the G median value obtained by the sorting process can be readily identified based on the index numbers, whereby the process of obtaining the median values of R and B can be performed easily.

It is to be noted that though in the foregoing embodiments, a description was made of an example in which the median processing was used in the snowfall correction to remove the snowfall noise, the present invention is not limited to this example, and may be applied widely to removal of other noise from the images or the like.

Also, in the foregoing embodiments, index numbers represented by numerals (1 to 7) were used as the identifiers assigned to the pixel values. However, the present invention is not limited to this, and the identifiers other than numerals, such as characters, may be used.

Further, in the foregoing embodiments, a description was made of examples in which images were of RGB, YUV or RAW format, but the present invention is not limited to these examples, and may be widely applied to images of other formats.

Further, in the second and fourth embodiments described above, the pixel value conversion unit 26 was configured to calculate Y values (brightnesses) or G values (average of G1 value and G2 value). However, the present invention is not limited to them, and the conversion may be performed to calculate pixel values of any appropriate kind to obtain appropriate median values in accordance with the use of the median processing.

Further, in the fifth and sixth embodiments described above, a configuration similar to that of the first embodiment, namely, a configuration in which a sorting process is performed on the G values to obtain R, G and B median values was adopted. However, the configurations shown in the fifth and sixth embodiments, namely, the configuration in which the pixel values obtained by the pixel value extraction unit 21 are not assigned index numbers (identifiers) corresponding to the frame images from which they were extracted and the configuration in which only the pixel values of the channel necessary for the sorting process are extracted may be applied to the configuration in which the sorting process is performed based on the pixel values that can be directly obtained from the frame images, as shown in the third embodiment.

The configurations shown in the fifth and sixth embodiments could be applied to the configuration in which a pixel value conversion process for obtaining, from the pixel values of multiple channels, another pixel value, as shown in the second and fourth embodiments. However, this is not preferable in view of increasing the processing speed as it would become necessary to perform the pixel value conversion process again in the search process for finding a frame image including a pixel value matching the median value obtained by the sorting unit 23.

Seventh Embodiment

Figure 19:
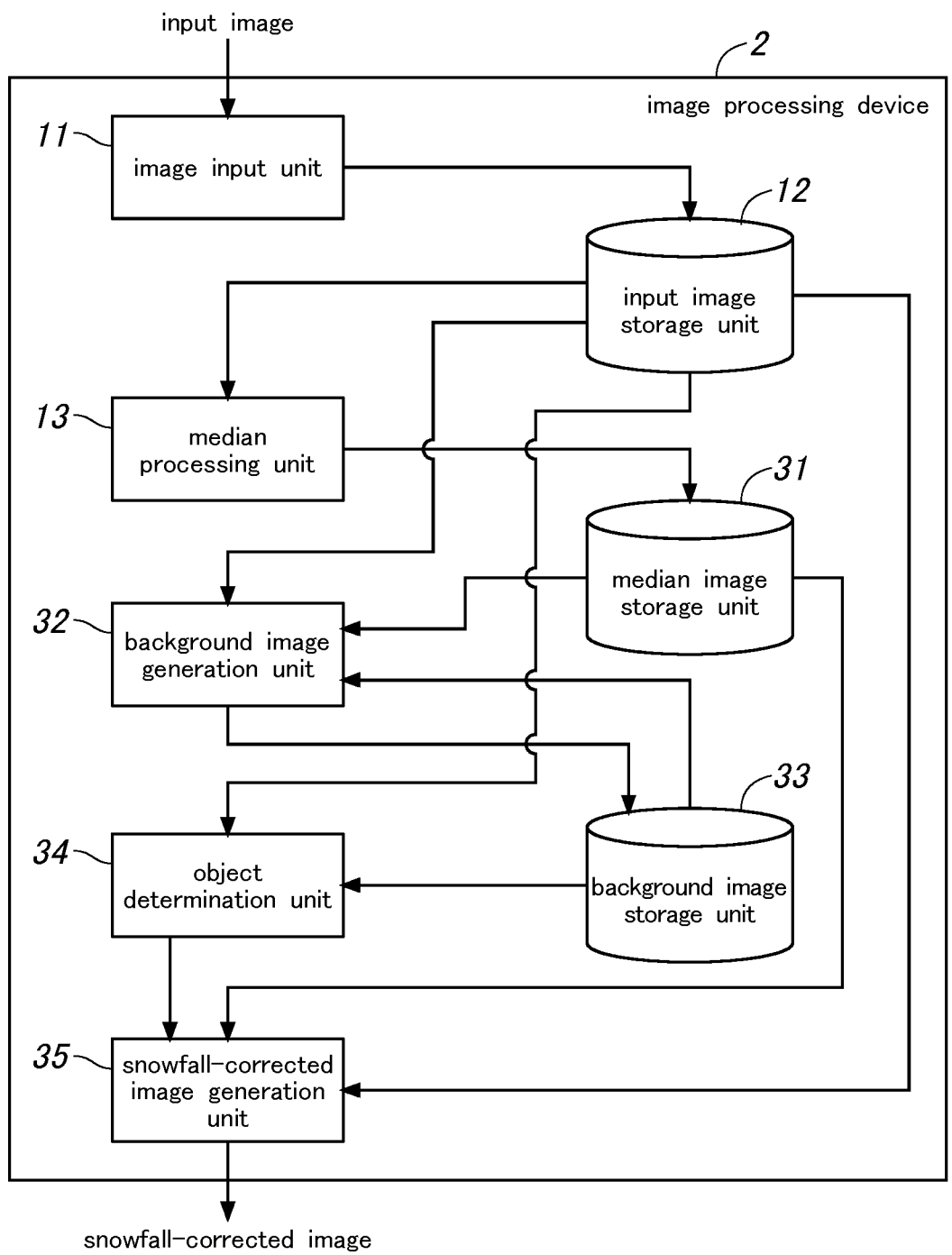
FIG. 19 is a block diagram showing a schematic structure of the image processing device 2 according to the seventh embodiment.
Figure 20:
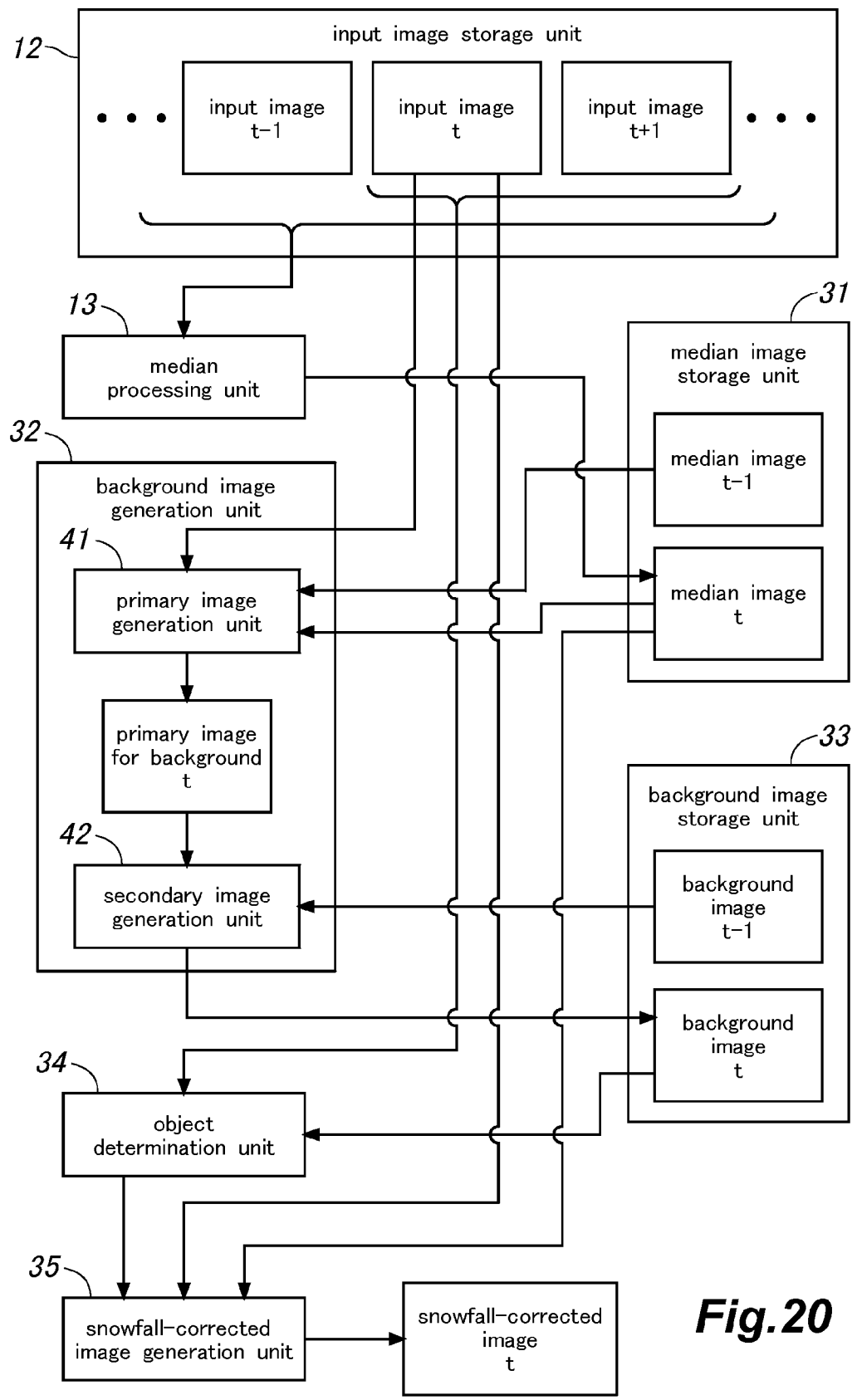
FIG. 20 is an explanatory diagram for explaining an overview of various image processing performed by the image processing device 2.

FIG. 19 is a block diagram showing a schematic structure of the image processing device 2 according to the seventh embodiment. FIG. 20 is an explanatory diagram for explaining an overview of various image processing performed by the image processing device 2. It is to be noted that, in FIG. 20, t, t−1, t+1 shown with images indicate imaging time points, where an image at a time point of interest is shown with an imaging time point t, and the immediately preceding and subsequent images are shown with imaging time points t−1 and t+1, respectively.

As shown in FIG. 19, the image processing device 2 includes an image input unit 11, an input image storage unit 12, a median processing unit 13, a median image storage unit 31, a background image generation unit 32, a background image storage unit 33, an object determination unit 34 and a snowfall-corrected image generation unit 35.

The image input unit 11 receives multiple temporally consecutive frame images input thereto. The input image storage unit 12 stores the multiple frame images input to the image input unit 11 (input images).

As shown in FIG. 20, the median processing unit 13 performs median processing in the time direction on a predetermined number (for example, seven) of the input images stored in the input image storage unit 12 to generate a median image. In this example, the median processing is performed on a total of seven input images including the input image at the time point of interest and three input images preceding and subsequent thereto. It is to be noted that the number of the input images on which the median processing is performed is not limited to seven. Further, the median processing may be performed on only the input image at the time point of interest and the input image preceding thereto or the image subsequent thereto.

The median image storage unit 31 stores the median images generated by the median processing unit 13. Specifically, in this embodiment, the median image storage unit 31 stores a median image at the immediately preceding time point generated by the previous processing and a median image at the time of interest generated by the current processing.

The background image generation unit 32 includes a primary image generation unit 41 and a secondary image generation unit 42. The primary image generation unit 41 performs a process of generating, based on the input image at the time point of interest stored in the input image storage unit 12 and the median image at the time point of interest as well as the median image at the immediately preceding time point stored in the median image storage unit 31, a primary image in which a change having appeared in the imaged object(s) is reflected based on the difference between the frames.

The secondary image generation unit 42 performs a process of generating a background image (secondary image) based on the primary image at the time of interest obtained by the primary image generation unit 41 and the background image at the immediately preceding time point. The background image at the immediately preceding time point generated by the previous processing and the background image at the time point of interest generated by the current processing are stored in the background image storage unit 33, and the secondary image generation unit 42 performs the process of generating the background image at the time point of interest based on the background image at the immediately preceding time point stored in the background image storage unit 33. The background image at the time point of interest generated by the background image generation unit 32 is stored in the background image storage unit 33.

The object determination unit 34 performs an object determination process of determining whether each pixel represents an object in motion other than a snow particle based on the input image at the time point of interest and the input image at the immediately subsequent time point stored in the input image storage unit 12 as well as the background image at the time point of interest stored in the background image storage unit 33.

It is to be noted here that an object in motion is an object moving relative to the imaging device 1, namely, an object whose position changes over multiple temporally consecutive input images. Thus, an object in motion may appear when an object itself moves as well as when the imaging device 1 is moved so that stationary objects as a whole moves relative to the imaging device 1 such as when the imaging device 1 is operated to pan or tilt.

The snowfall-corrected image generation unit 35 performs a process of generating a snowfall-corrected image based on the input images stored in the input image storage unit 12, the median images stored in the median image storage unit 31 and the result of determination made by the object determination unit 34.

Figure 21:
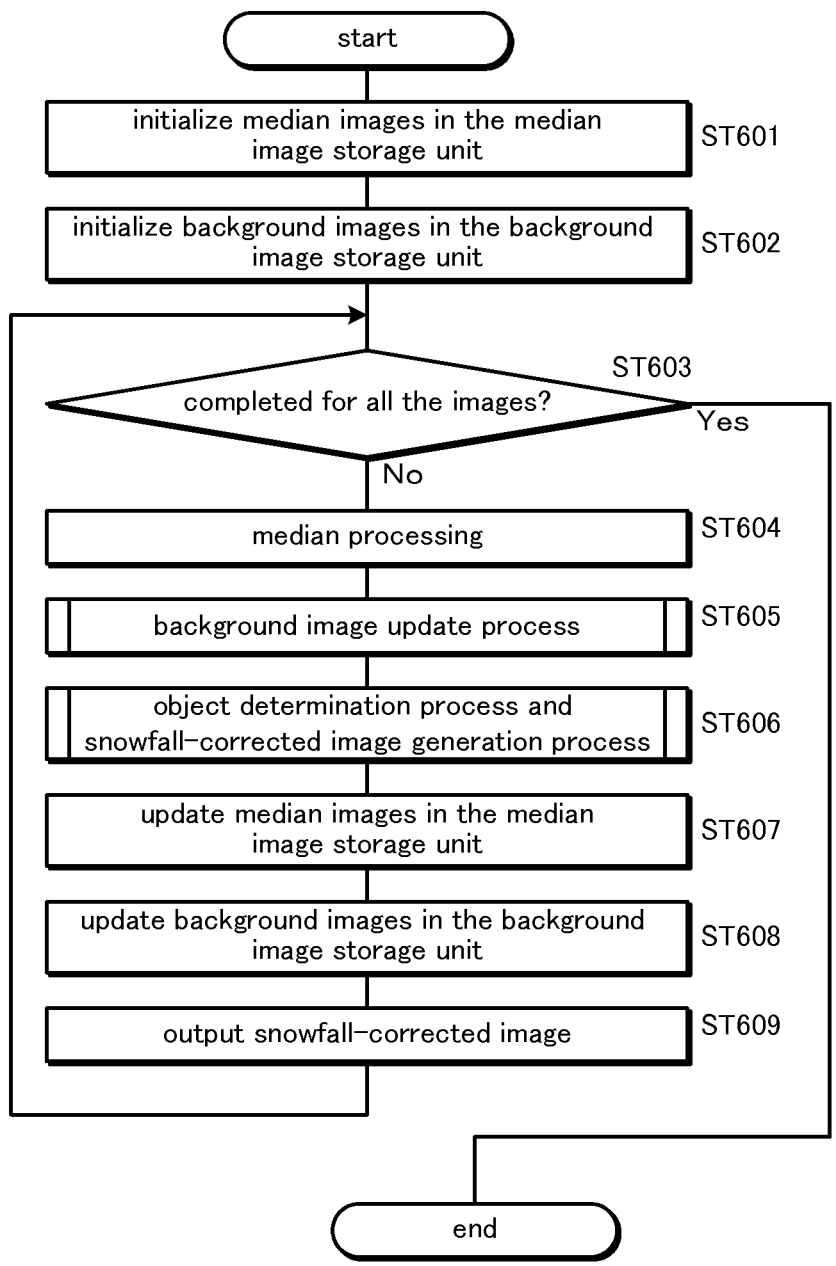
FIG. 21 is a flowchart showing a procedure of a process performed by the image processing device 2.

FIG. 21 is a flowchart showing a procedure of a process performed by the image processing device 2.

In this procedure, first, a process of initializing the median images in the median image storage unit 31 (ST601) and a process of initializing the background images in the background image storage unit 33 (ST602) are performed. It is to be noted that, for the first image, the images necessary for the following processing, namely, the median image and the background image at the immediately preceding time point are not present in the median image storage unit 31 and the background image storage unit 33, respectively. Therefore, to use an input image as these images for the sake of convenience, in the initialization processes, the input image at the current time point is stored as the median image and the background image at the immediately preceding time point.

Next, a determination is made of whether processing is completed for all the input images (ST603), such that the below-described processing for each image (ST604 to ST609) is performed until the processing is completed for all the input images.

In the processing for each image, first, the median processing unit 13 performs median processing (ST604), and then, the background image generation unit 32 performs a background update process (ST605). Thereafter, the object determination unit 34 and the snowfall-corrected image generation unit 35 perform an object determination process and a snowfall-corrected image generation process, respectively (ST606).

Subsequently, a process of updating median images in the median image storage unit 31 (ST607) and a process of updating the background images in the background image storage unit 33 (ST608) are performed. Here a process of substituting the median image and the background image at the time point of interest stored in the median image storage unit 31 and the background image storage unit 33 for the median image and the background image at the immediately preceding time point is performed. Then, a snowfall-corrected image at the time of interest generated by the snowfall-corrected image generation unit 35 is output (ST609).

Now, a detailed description will be given of the background update process (ST605 in FIG. 21) performed by the background image generation unit 32 shown in FIG. 20.

Figure 22:
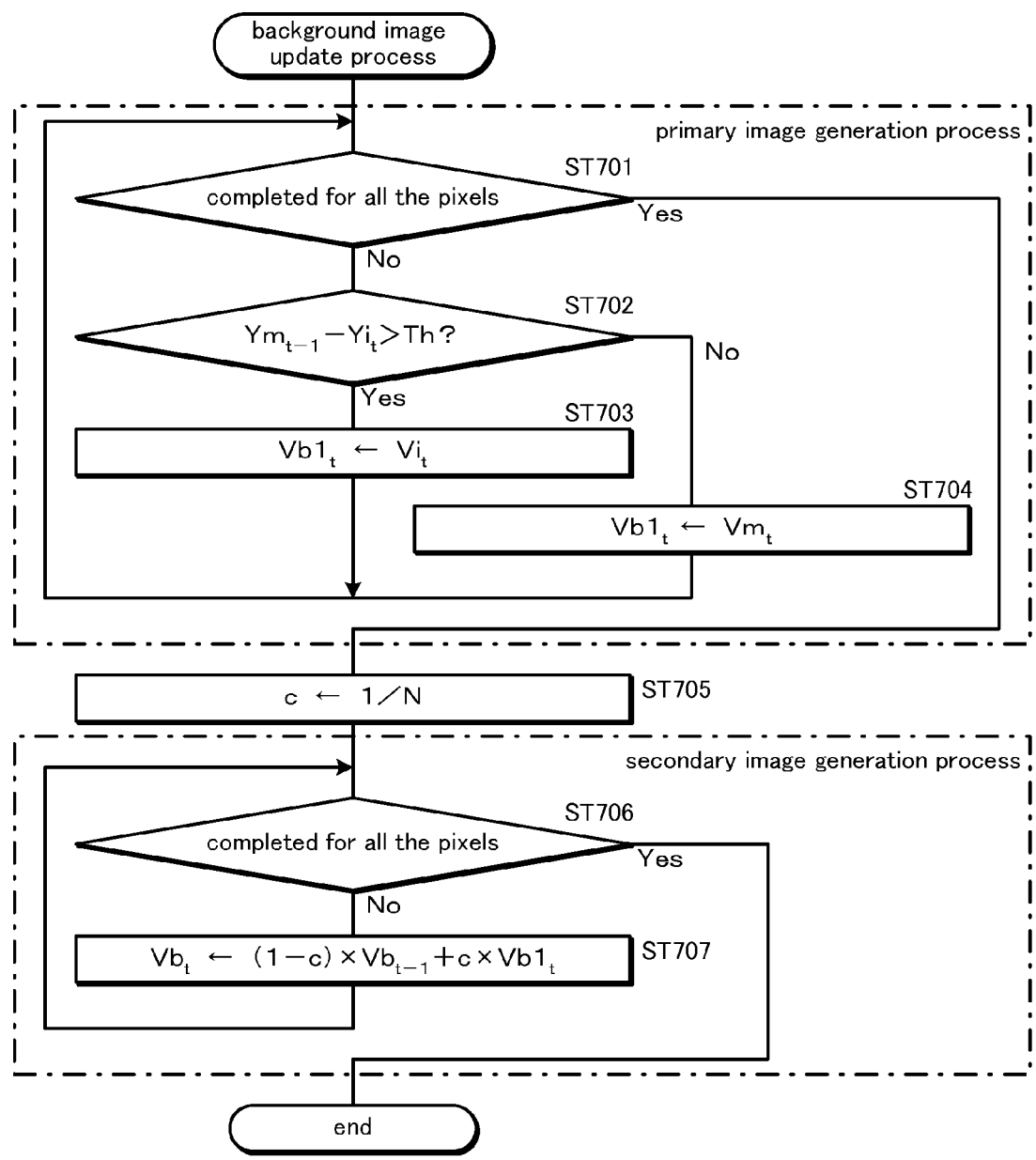
FIG. 22 is a flowchart showing a procedure of a background update process performed by a background image generation unit 32.

FIG. 22 is a flowchart showing a procedure of the background update process performed by the background image generation unit 32. In this procedure, first, the primary image generation unit 41 performs a process of generating a primary image in which a change having appeared in the imaged object(s) is reflected based on the difference between the frames. In this primary image generation process, first, it is determined whether processing is completed for all the pixels (ST701), such that processing for obtaining a pixel value of the primary image (ST702 to ST704) is repeated for each pixel until the processing is completed for all the pixels.

In this processing for each pixel, first, it is determined, based on a state of change in the pixel value of the image at the time of interest relative to the image at the immediately preceding time point, whether a significant change has appeared in the imaged object (ST702). Specifically, in this embodiment, a difference between the brightness $Ym_{t-1}$ of the median image at the immediately preceding time point and the brightness $Yi_t$ of the input image at the time point of interest is calculated, and the amount of change in the brightness $(Ym_{t-1}-Yi_t)$ is compared with a predetermined threshold value Th, so that when the amount of change in the brightness $(Ym_{t-1}-Yi_t)$ is greater than the threshold value Th, as in Expression 1 given below, it is determined that a significant change has appeared in the imaged object.

$$Ym_{t-1}-Yi_t>Th \quad \text{(Expression 1)}$$

Subsequently, a process of determining a pixel value $Vb1_t$ of the primary image at the time of interest depending on the result of determination of whether a significant change has appeared in the imaged object (ST702) is performed (ST703, ST704). Here, in the case where the amount of change in the brightness $(Ym_{t-1}-Yi_t)$ is greater than the threshold value Th and it is determined that a significant change has appeared in the imaged object (Yes in ST702), a pixel value $Vi_t$ of the input image is decided to be adopted as the pixel value $Vb1_t$ of the primary image (ST703). On the other hand, in the case where the amount of change in the brightness $(Ym_{t-1}-Yi_t)$ is less than or equal to the threshold value Th (No in ST702), it is determined that the change in the brightness is due to noise, and a pixel value $Vm_t$ of the median image is decided to be adopted as the pixel value $Vb1_t$ of the primary image (ST704).

In this way, it is possible to remove a small change caused in the imaged object as noise, while allowing a large change caused in the imaged object to be reflected in the primary image. It is to be noted that the threshold value Th may be set depending on the state of change in the brightness to be removed as noise or other factors, and may preferably be set to 15 in 256 gradation levels, for example.

When the pixel of interest is a pixel representing a snow particle, the brightness $Yi_t$ becomes higher, and the amount of change in the brightness $(Ym_{t-1}-Yi_t)$ becomes a negative value, while the threshold value Th is a positive value (0 to 255), and thus, the amount of change in the brightness $(Ym_{t-1}-Yi_t)$ becomes less than the threshold value Th or Expression 1 does not hold. As a result, the median pixel value is adopted, whereby the snowfall noise can be removed.

It is to be noted that though, in the determination of whether a significant change has appeared in the imaged object constituting the background (ST702), the median image at the immediately preceding time point was used, it is also possible to use the input image at the immediately preceding time point. However, because the snowfall noise has been removed in the median image, if the median image is used, the amount of change in the brightness will appear larger, and thus, the determination accuracy can be improved.

After the pixel values $Vb1_t$ of the primary image have been determined as described above, then, a process of setting a background update rate c (1/N) is performed (ST706), followed by a process of generating a background image (secondary image) performed by the secondary image generation unit 42 (ST706, ST707). In this secondary image generation process, first, it is determined whether processing is completed for all the pixels (ST706), such that processing for obtaining a pixel value of the background image (secondary image) (ST707) is repeated for each pixel until the processing is completed for all the pixels.

In this processing for each pixel, based on the pixel value $Vb1_t$ of the primary image at the time of interest obtained by the primary image generation unit 41 and the pixel value $Vb_{t-1}$ of the background image at the immediately preceding time point, a pixel value $Vb_t$ of the background image at the time point of interest is obtained by use of Expression 2 given below, wherein the background update rate c is a ratio indicating how much the primary image obtained by the primary image generation unit 41 should be reflected in the background image:

$$Vb_t=(1-c)\times Vb_{t-1}+c\times Vb1_t \quad \text{(Expression 2)}$$

The background update rate c is given as an inverse of an update frame number N (1/N). The update frame number N indicates the number of frame images (input images) for which the background image is updated, and is set by the user. According to Expression 2, a change in the imaged object having appeared in the primary image does not appear immediately in the background image, and when the changed state of the imaged object continues, the change appears gradually in the background image. By increasing and decreasing the update frame number N, it is possible to adjust the time period required for a change caused in the imaged object constituting the background to appear clearly in the background image.

It is to be noted here that when the update frame number N is small, the influence of the primary image becomes large, which may make the background image unstable. Conversely, when the update frame number N is large, a change in the image object is reflected less readily in the background image. Thus, by setting the update frame number N appropriately depending on the imaging circumstances, it is possible to generate a background image which is stable and in which a change in the imaged object is reflected properly. For example, in the case where the imaged object undergoes a significant change as in the case where the imaging device 1 is operated to pan or tilt, it is possible to cause the change in the imaged object to be reflected in the background image quickly by setting the update frame number N to a small value.

Further, by performing the process of setting the background update rate c (ST706) during the flow, it is possible to change the background update rate c during operation. In other words, an input operation by the user to input the update frame number N is received during operation, and the background update rate c calculated from the update frame number N input here is used in the next and later processing.

Next, a detailed description will be made of the object determination process and the snowfall-corrected image generation process (ST606 in FIG. 21) respectively performed by the object determination unit 34 and the snowfall-corrected image generation unit 35 shown in FIG. 20.

Figure 23:
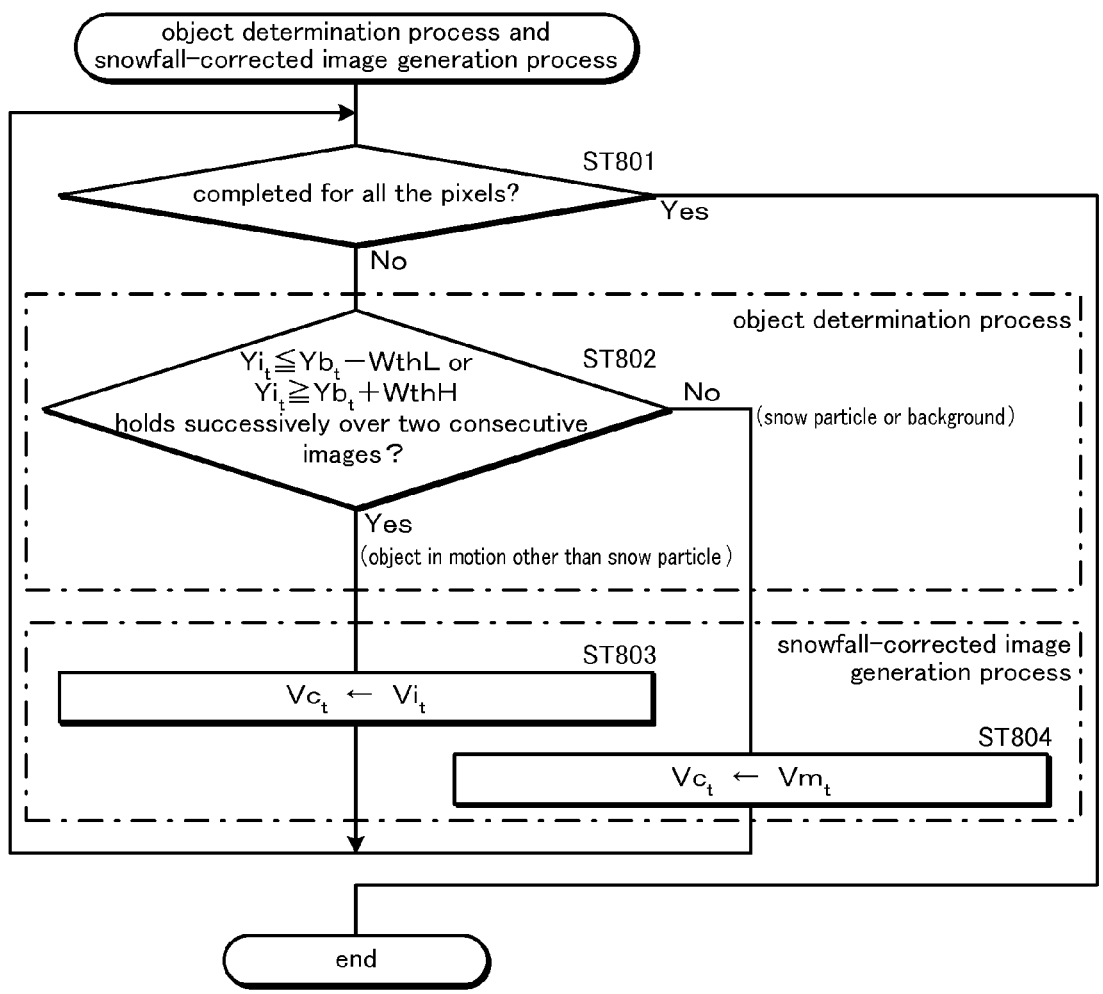
FIG. 23 is a flowchart showing a procedure of an object determination process and a snowfall-corrected image generation process performed by an object determination unit 34 and a snowfall-corrected image generation unit 35, respectively.
Figure 24:
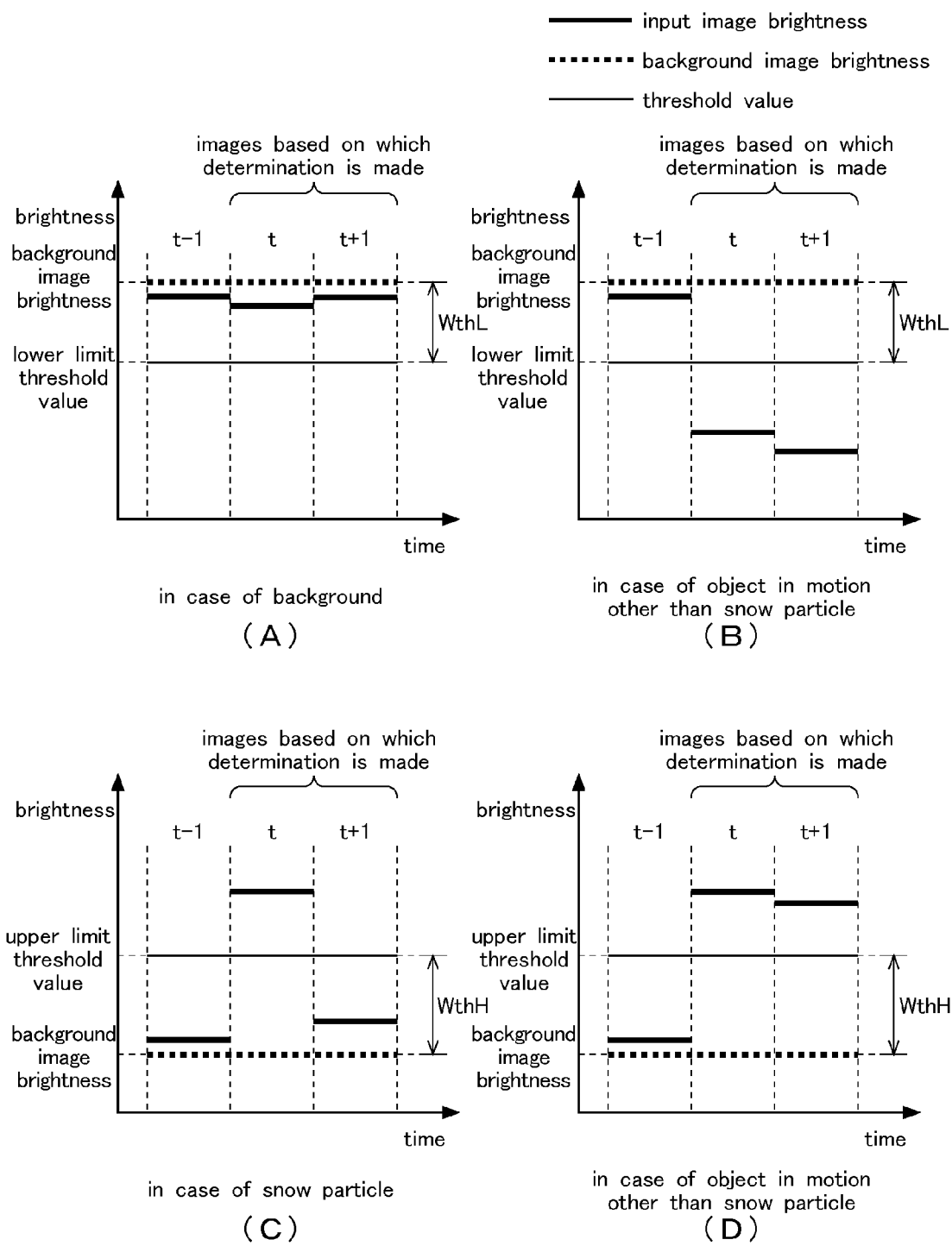
FIGS. 24 (A)-(D) are explanatory diagrams for explaining an overview of the process performed by the object determination unit 34.

FIG. 23 is a flowchart showing a procedure of the object determination process and the snowfall-corrected image generation process performed by the object determination unit 34 and the snowfall-corrected image generation unit 35, respectively. FIG. 24 is an explanatory diagram for explaining an overview of the process performed by the object determination unit 34.

As shown in FIG. 23, in this procedure, first, it is determined whether processing is completed for all the pixels (ST801), such that the object determination made by the object determination unit 34 (ST802) and the snowfall-corrected image generation process performed by the snowfall-corrected image generation unit 35 (ST803, ST804) are repeated for each pixel until the processing is completed for all the pixels.

In the object determination process (ST802), as described in the foregoing, it is determined whether each pixel represents an object in motion other than a snow particle. In this object determination process, if a state in which the value of a pixel deviates from a threshold value has occurred successively over a predetermined number of temporally consecutive input images, it is determined that the pixel represents an object in motion other than a snow particle, while if a state in which the value of a pixel deviates from the threshold value does not occur successively over the predetermined number of temporally consecutive input images, it is determined that the pixel does not represent an object in motion other than a snow particle, namely, the pixel represents a snow particle or the background (substantially stationary object).

Particularly, in this embodiment, the determination is made based on two temporally consecutive input images, namely, the input image at the time point of interest and the input image at the immediately subsequent time point. Further, threshold values to be compared with each pixel value of the input images are set based on the pixel value of the background image, and brightness is used as the pixel value. Specifically, based on the brightness $Yb_t$ of the background image and threshold widths WthL, WthH, an upper limit threshold value $(Yb_t+WthH)$ and a lower limit threshold value $(Yb_t-WthL)$ are set, and these threshold values are compared with the brightness $Yi_t$ of each input image. Expressions for determination used here are Expressions 3 and 4 given below:

$$Yi_t \leq Yb_t - WthL \quad \text{(Expression 3)}$$

$$Yi_t \geq Yb_t + WthH \quad \text{(Expression 4)}$$

Expression 3 is an expression for determination indicating that the brightness $Yi_t$ of the input image is smaller than the brightness $Yb_t$ of the background image, while Expression 4 is an expression for determination indicating that the brightness $Yi_t$ of the input image is greater than the brightness $Yb_t$ of the background image, where, relative to the pixel value $Yb_t$ of the background image, a threshold width WthL in the negative direction and a threshold width WthH in the positive direction are set separately.

These threshold widths WthL, WthH each indicate a variation range for determining whether a pixel represents an object in motion. By adjusting WthL based on the brightness of an object other than a snow particle, it is possible to reduce the afterimage of the object. Further, by adjusting WthH based on the brightness of the snow particles, it is possible to enhance the effect of removing the snow particles. Specifically, by setting WthL, it is possible to remove the afterimage of an object in motion having a brightness lower than that of the background (such an object in motion may be a black vehicle body, for example). Further, by setting WthH, it is possible to remove the snow particles and reduce the afterimage of an object in motion having a brightness higher than that of the background (such an object in motion may be a white vehicle body or a turned-on headlight portion of a vehicle, for example). The setting of these threshold widths WthL, WthH may be adapted such that a user can adjust them while checking the effects of removing the snow particles and reducing the afterimage on the screen.

Here, in a case where the pixel of interest represents the background, the brightness $Yi_t$ of the input image is close to the brightness $Yb_t$ of the background image, and the brightness does not change significantly from the current input image to the immediately subsequent input image. Accordingly, as shown in FIG. 24(A), in each of the input image at the time point of interest and the input image at the immediately subsequent time point, the brightness $Yi_t$ does not become smaller than the lower limit threshold value $(Yb_t-WthL)$, namely, Expression 3 does not hold successively for two input images.

Further, in a case where the pixel of interest represents a snow particle, the snow particle moves as the input image changes to the one at the next time point so that the snow particle comes not to cover the pixel of interest, and thus, the pixel of interest does not represent a snow particle successively for two input images. Accordingly, as shown in FIG. 24(C), even if the brightness $Yi_t$ is greater than the upper limit threshold value $(Yb_t+WthH)$ in the input image at the time point of interest, the brightness $Yi_t$ will return to a value close to the brightness $Yb_t$ of the background and becomes lower than the upper limit threshold value in the input image at the immediately subsequent time point, namely, Expression 4 does not hold successively for two input images.

On the other hand, in a case where the pixel of interest represents an object in motion other than snow particles, the brightness $Yi_t$ of the input image differs significantly from the brightness $Yb_t$ of the background image, and this state continues when the input image changes to the input image at the next time point. Accordingly, as shown in FIG. 24(B), in each of the input image at the time point of interest and the input image at the immediately subsequent time point, the brightness $Yi_t$ of the input image is smaller than the lower limit threshold value ($Yb_t$−WthL), namely, Expression 3 holds successively for two input images, or, as shown in FIG. 24(D), in each of the input image at the time point of interest and the input image at the immediately subsequent time point, the brightness $Yi_t$ of the input image is greater than the upper limit threshold value ($Yb_t$+WthH), namely, Expression 4 holds successively for two input images.

Thus, based on whether Expression 3 or Expression 4 holds successively for two input images, it is possible to determine whether the pixel of interest represents an object in motion other than a snow particle. Namely, when Expression 3 or Expression 4 holds successively for two input images, it is determined that the pixel of interest represents an object in motion other than a snow particle, and when neither Expression 3 nor Expression 4 holds successively for two input images, it is determined that the pixel of interest represents a snow particle or the background (substantially stationary object).

Subsequently, as shown in FIG. 23, the snowfall-corrected image generation unit 35 performs a process of determining the pixel value $Vc_t$ of the snowfall-corrected image depending on the result of the object determination performed by the object determination unit 34 (ST803, ST804). Here, in the case where Expression 3 or Expression 4 holds successively for two input images, namely, the pixel of interest represents an object in motion other than a snow particle (Yes in ST802), the pixel value $Vi_t$ of the input image is decided to be adopted as the pixel value $Vc_t$ of the snowfall-corrected image (ST803). On the other hand, in the case where neither Expression 3 nor Expression 4 holds successively for two input images, namely, the pixel of interest represents a snow particle or the background (No in ST802), the pixel value $Vm_t$ of the median image is decided to be adopted as the pixel value $Vc_t$ of the snowfall-corrected image (ST804).

As described above, in the case where the pixel of interest represents an object in motion other than a snow particle, the pixel value of the input image not subjected to the median processing is adopted, and this can prevent the image of the object in motion other than a snow particle from remaining and causing an afterimage to emerge. On the other hand, in the case where the pixel of interest represents a snow particle, the pixel value of the median image is adopted, whereby the snowfall noise is removed. Further, in the case where the pixel of interest represents the background, the pixel value of the median image is adopted.

It is to be noted that in the case of a large snow particle, the brightness may exceed the upper limit threshold value successively for two input images. In such a case, the relevant pixel is determined to represent an object in motion other than snow particles, and hence the pixel value of the input image is adopted, so that the snowfall noise is not removed. However, such a case occurs rarely, and a practically sufficient effect can be achieved.

Eighth Embodiment

Figure 25:
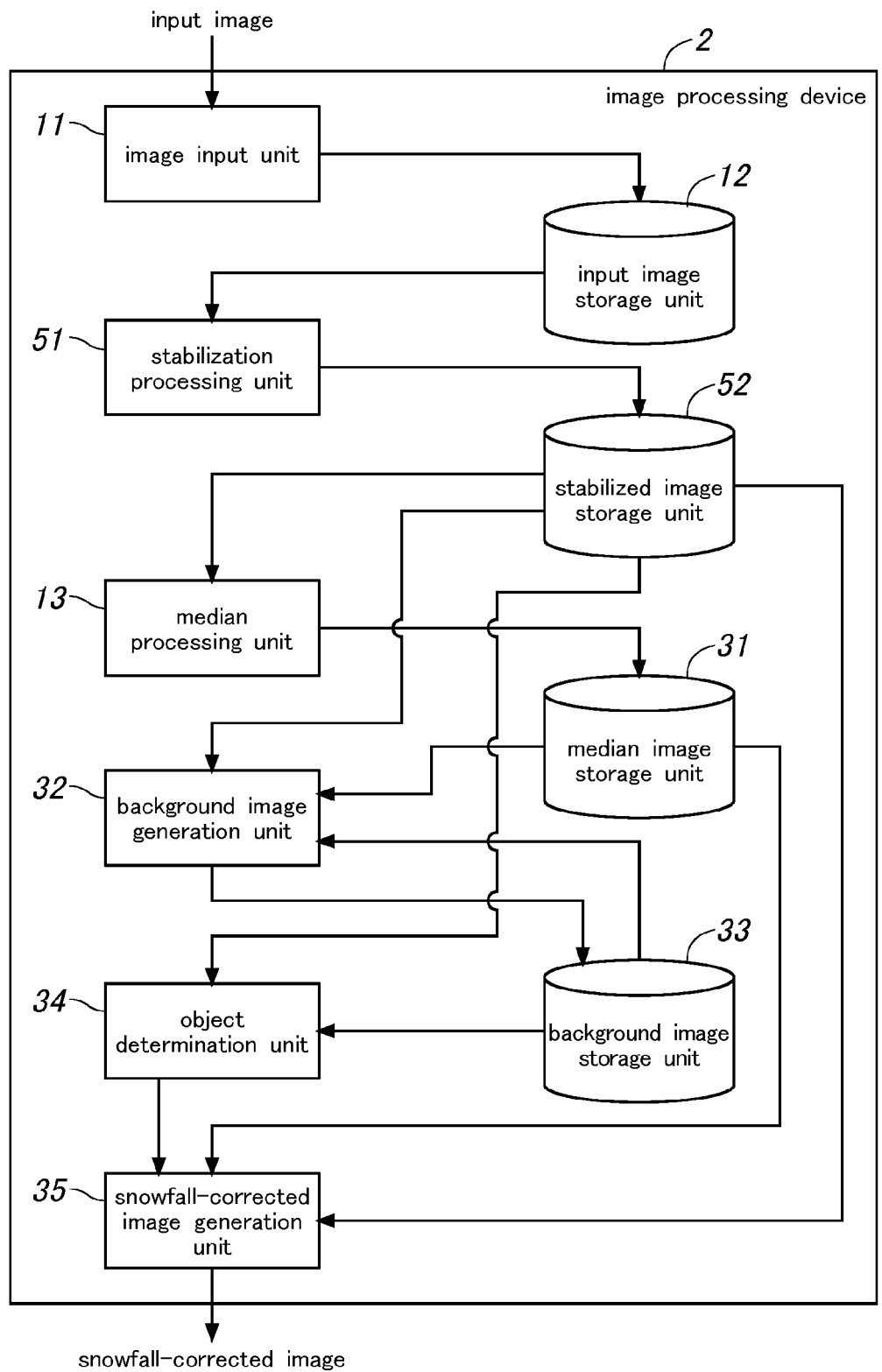
FIG. 25 is a block diagram showing a schematic structure of the image processing device 2 according to the eighth embodiment.

FIG. 25 is a block diagram showing a schematic structure of the image processing device 2 according to the eighth embodiment. It is to be noted that this embodiment is the same as the foregoing embodiment except for the points specifically mentioned here.

In the eighth embodiment, as in the seventh embodiment, the image processing device 2 includes the image input unit 11, the input image storage unit 12, the median processing unit 13, the median image storage unit 31, the background image generation unit 32, the background image storage unit 33, the object determination unit 34 and the snowfall-corrected image generation unit 35. In the second embodiment, the image processing device 2 further includes a stabilization processing unit 51 and a stabilized image storage unit 52.

The stabilization processing unit 51 performs a stabilization process for suppressing shaking of the object images in the input images as a whole when the imaging device 1 shakes due to vibration or the like. This stabilization process makes it possible to avoid decrease in the image quality such as generation of an afterimage due to movement of an image of an object(s). The stabilized image storage unit 52 stores stabilized images generated by the stabilization processing unit 51.

The stabilized images stored in the stabilized image storage unit 52 are used in the processes performed by the median processing unit 13, the background image generation unit 32, the object determination unit 34 and the snowfall-corrected image generation unit 35. In the first embodiment, input images were used in the processes performed by the median processing unit 13, the background image generation unit 32, the object determination unit 34 and the snowfall-corrected image generation unit 35, but in this second embodiment, the stabilized images are used instead of the input images.

It is to be noted that, in the seventh embodiment, as shown in FIG. 25, the object determination was made based on two temporally consecutive input images based on the insight that, with a typical frame rate (for example, 30 fps), the snow particle moves while the input image changes to the one at the next time point so that the snow particle comes not to cover the pixel of interest. However, it is also possible to make the determination based on three or more input images, and there may be a case where it is preferred to increase the number of the input images based on which the determination is to be made as the frame rate increases, for example.

Further, in the foregoing embodiments, a description was made of the snowfall correction process for removing the snowfall noise. However, the present invention is not limited to such snowfall correction process, and may be widely applicable to the use of removing general noise other than the snowfall noise, and is particularly suitable to the use of removing noise caused by noise objects (small objects falling or floating in the air) other than snow particles. Such noise objects may include, besides snow particles, rain drops when it rains, and dust or flower petals floating in the air, for example.

INDUSTRIAL APPLICABILITY

The image processing device and the image processing method according to the present invention can increase the processing speed when median processing in the time direction is performed on color images, and are useful as an image processing device and an image processing method for performing median processing in the time direction on multiple temporally consecutive captured images or the like.

GLOSSARY 1 imaging device
2 image processing device
11 image input unit
12 input image storage unit
13 median processing unit
14 pixel value storage unit
21 pixel value extraction unit
22 number assignment unit (identifier assignment unit)
23 sorting unit (pixel value selection unit)
24 median value obtaining unit (pixel value obtaining unit)
25 median image generation unit (output pixel value determination unit)
26 pixel value conversion unit
32 background image generation unit
34 object determination unit
35 snowfall-corrected image generation unit (corrected image generation unit)

The invention claimed is:

1. An image processing device for generating a snowfall-corrected image which has snowfall noise removed from temporally consecutive input images, the device comprising:
   a processor that executes instructions, the instructions, when executed by the processor, causes the processor to perform operations including:
   performing median processing in a time direction on temporally consecutive input images, the input images including an image at a time point of interest;
   generating a median image at the time point of interest by performing the median processing;
   generating a primary image at the time point of interest based on the input image at the time point of interest, the median image at the time point of interest, and a difference between a median image at a time point immediately preceding the time point of interest and the input image at the time point of interest;
   generating a background image at the time point of interest based on the primary image at the time point of interest and a background image at the time point immediately preceding the time point of interest;
   determining whether each pixel of the input image at the time point of interest represents an object in motion other than snow particle based on the input image at the time point of interest, an input image at a time point immediately subsequent to the time point of interest, and the background image at the time point of interest; and
   generating the snowfall-corrected image:
      when a pixel value of the input image at the time point of interest is adopted as a pixel value of the snowfall-corrected image when a pixel of the input image at the time point of interest represents the object in motion, and
      when a pixel value of the median image at the time point of interest is adopted as the pixel value of the snowfall-corrected image when the pixel of the input image at the time point of interest represents the snow particle.

2. The image processing device according to claim 1, further comprising a display device that displays the snowfall-corrected image.

3. The image processing device according to claim 1, wherein the input images are images captured by an imaging device.

4. The image processing device according to claim 1, wherein the processor further performs:
   calculating an amount of change in brightness between a brightness of the input image at the time point of interest and a brightness of the median image or the input image at the time point immediately preceding the time point of interest; and
   determining a significant change has appeared in the object in motion when the amount of change in brightness is greater than a first predetermined threshold value.

5. The image processing device according to claim 4, wherein the processor further performs:
   determining the pixel value of the median image at the time point of interest as a pixel value of the primary image at the time point of interest when the amount of change in brightness is less than or equal to the first threshold value.

6. The image processing device according to claim 4, wherein the processor further performs:
   determining the pixel value of the input image at the time point of interest as a pixel value of the primary image at the time point of interest when the amount of change in brightness is greater than the first predetermined threshold value.

7. The image processing device according to claim 1, wherein the processor further performs:
   determining, in an initialization process, the pixel value of the input image at the time point of interest as a pixel value of the median image at the time point immediately preceding the time point of interest and a pixel value of the background image at the time point immediately preceding the time point of interest.

8. The image processing device according to claim 4, wherein the first threshold value is a positive value.

9. The image processing device according to claim 1, wherein the processor further performs:
   determining that,
      the pixel value of the input image at the time point of the interest represents the object in motion when a pixel value, corresponding to the pixel value of the input image at the time point of the interest, successively deviates from a second threshold value over a predetermined number of the temporally consecutive input images, and
      the pixel value of the input image at the time point of the interest represents the snow particle, a background, or a substantially stationary object when the pixel value, corresponding to the pixel value of the input image at the time point of the interest, does not successively deviate from second threshold value over the predetermined number of the temporally consecutive input images.

10. The image processing device according to claim 1, wherein the temporally consecutive input images further include the input image at the time point immediately subsequent to the time point of interest.

11. An image processing method for generating a snowfall-corrected image which has snowfall noise removed from temporally consecutive input images, the method comprising:
   performing median processing in a time direction on temporally consecutive input images, the input images including an image at a time point of interest;

generating median image at the time point of interest by performing the median processing;

generating a primary image at the time point of interest based on the input image at the time point of interest, the median image at the time point of interest, and the difference between a median image at a time point immediately preceding the time point of interest and the input image at the time point of interest;

generating a background image at the time point of interest based on the primary image at the time point of interest and a background image at the time point immediately preceding the time point of interest;

determining whether each pixel of the input image at the time point of interest represents an object in motion other than snow particle based on the input image at the time point of interest, an input image at a time point immediately subsequent to the time point of interest and the background image at the time point of interest; and generating the snowfall-corrected image:
- when a pixel value of the input image at the time point of interest is adopted as a pixel value of the snowfall-corrected image when a pixel of the input image at the time point of interest represents the object in motion, and
- when a pixel value of the median image at the time point of interest is adopted as the pixel value of the snowfall-corrected image when the pixel of the input image at the time point of interest represents the snow particle.

* * * * *